(12) United States Patent
Zhu et al.

(10) Patent No.: US 8,737,388 B2
(45) Date of Patent: *May 27, 2014

(54) METHOD, APPARATUS AND SYSTEM FOR PROCESSING PACKETS

(71) Applicant: Huawei Technologies Co., Ltd., Shenzhen (CN)

(72) Inventors: Zhiqiang Zhu, Beijing (CN); Rihua Zhang, Beijing (CN); Guibin Hou, Beijing (CN); Yong Xu, Beijing (CN); Wenhui Xie, Beijing (CN); Bo Ma, Shenzhen (CN); Guolu Gao, Beijing (CN); Xiaoping Lu, Beijing (CN); Cuihua Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,929

(22) Filed: Jul. 5, 2013

(65) Prior Publication Data

US 2013/0297671 A1 Nov. 7, 2013

Related U.S. Application Data

(63) Continuation of application No. 13/030,898, filed on Feb. 18, 2011, now Pat. No. 8,509,239, which is a continuation of application No. PCT/CN2009/073100, filed on Aug. 5, 2009.

(30) Foreign Application Priority Data

| Aug. 18, 2008 | (CN) | 2008 1 0142458 |
| Sep. 10, 2008 | (CN) | 2008 1 0212182 |
| Sep. 12, 2008 | (CN) | 2008 1 0149594 |
| Dec. 18, 2008 | (CN) | 2008 1 0183551 |

(51) Int. Cl.
H04L 12/56 (2006.01)

(52) U.S. Cl.
USPC .................... 370/352; 370/389; 370/220

(58) Field of Classification Search
USPC .......................... 370/392, 389, 220
See application file for complete search history.

(56) References Cited

U.S. PATENT DOCUMENTS

| 6,631,422 B1 | 10/2003 | Althaus et al. |
| 7,822,157 B2 * | 10/2010 | Keller et al. .................. 375/354 |

(Continued)

FOREIGN PATENT DOCUMENTS

| CN | 1412988 A | 4/2003 |
| CN | 1642135 | 1/2004 |

(Continued)

OTHER PUBLICATIONS

International Search Report issued in corresponding PCT Application No. PCT/CN2009/073100; mailed Nov. 12, 2009.

(Continued)

Primary Examiner — Dang Ton
Assistant Examiner — Mewale Ambaye
(74) Attorney, Agent, or Firm — Brinks Gilson & Lione

(57) ABSTRACT

A system for processing packets in a distributed architecture system includes a main control board, at least one service board, and at least one interface board. The system determines a specified CPU corresponding to a received packet; and, by the service board corresponding to the CPU, processes the received packet. The received packets are processed in the service board corresponding to the specified CPU. Therefore, the packets are evenly distributed to all service boards for being processed, the workload of the main control board is relieved, the service throughput is increased significantly, and the packet processing efficiency of the whole architecture is improved.

18 Claims, 13 Drawing Sheets

(56) References Cited

U.S. PATENT DOCUMENTS

| | | | |
|---|---|---|---|
| 7,995,143 B2 * | 8/2011 | Christison et al. | 348/500 |
| 2006/0114912 A1 | 6/2006 | Kwan et al. | |

FOREIGN PATENT DOCUMENTS

| | | |
|---|---|---|
| CN | 1503520 A | 6/2004 |
| CN | 1553661 A | 12/2004 |
| CN | 1642135 A | 7/2005 |
| CN | 1649326 A | 8/2005 |
| CN | 1838589 A | 9/2006 |
| CN | 1838609 A | 9/2006 |
| CN | 1863101 A | 11/2006 |
| CN | 1984131 A | 6/2007 |
| CN | 101106450 | 8/2007 |
| CN | 101106450 A | 1/2008 |
| CN | 101197664 A | 6/2008 |
| CN | 101345689 A | 1/2009 |
| CN | 101350759 A | 1/2009 |
| CN | 101355505 A | 1/2009 |
| CN | 101442470 A | 5/2009 |
| CN | 101355505 B | 2/2011 |
| CN | 101350759 B | 4/2011 |
| CN | 101345689 B | 7/2011 |
| EP | 1694024 A1 | 8/2006 |
| WO | WO 2005/086461 A1 | 9/2005 |

OTHER PUBLICATIONS

Office Action issued in corresponding Chinese Patent Application No. 200810149594.7, mailed Mar. 30, 2010.

Office Action issued in corresponding Chinese Patent Application No. 200810212182.3, mailed Apr. 1, 2010.

Office Action issued in corresponding Chinese Patent Application No. 200810183551.0, mailed Jul. 14, 2010.

Written Opinion of the International Searching Authority issued in corresponding PCT Patent Application No. PCT/CN2009/073100, mailed Nov. 12, 2009.

Yong-liang, "Security VPN Constructed by the Combination of L2TP and IPSec", Journal of Taizhou University, vol. 26, No. 6, Dec. 2004.

* cited by examiner

METHOD, APPARATUS AND SYSTEM FOR PROCESSING PACKETS

CROSS-REFERENCE TO RELATED APPLICATIONS

This application is a continuation of U.S. patent application Ser. No. 13/030,898, filed on Feb. 18, 2011, which is a continuation of International Application No, PCT/CN2009/073100, filed on Aug. 5, 2009. The International Application claims priority to Chinese Patent Application No. 200810142458.5, filed on Aug. 18, 2008 and Chinese Patent Application No. 200810212182.3, filed on Sep. 10, 2008 and Chinese Patent Application No. 200810183551.0, filed on Dec. 18, 2008 and Chinese Patent Application No. 200810149594.7, filed on Sep. 12, 2008. The afore-mentioned patent applications are hereby incorporated by reference in their entireties.

FIELD OF THE APPLICATION

The present application relates to communication technologies, and in particular, to a method, an apparatus, and a system for processing packets.

BACKGROUND

Virtual Private Network (VPN) is a technology of constructing a private network on a public network through tunneling, encryption, decryption, and authentication. The VPN technology is characterized by low costs, high security, high extensibility, manageability, and comprehensive control, and is a trend of enterprise networks. Unlike a traditional network, a VPN does not exist physically, but uses the existing public network to construct a virtual network through resource configuration. A VPN is a logical network exclusively accessible to a specific enterprise or user group. The VPN is not a simple upper-layer service, but is an interconnected network between private network users. Tunneling protocols of the VPN include Layer 2 Tunneling Protocol (L2TP), Security Architecture for IP network (IPSec) protocol, and Generic Routing Encapsulation (GRE) protocol. The tunneling protocol of the VPN uses a tunneling technology on the protocol layer. A tunnel is a virtual point-to-point connection. In practice, a tunnel may be regarded as a virtual interface that supports only point-to-point connections. This interface provides a path through which the encapsulated data packets can be transmitted. The data packets are encapsulated and decapsulated on both ends of a tunnel.

In the process of applying the VPN tunneling protocol to process packets, a distributed architecture of multiple service boards is generally in use. In such architecture, a main control board is responsible for negotiating and setting up tunnels, and processing packets. The workload of the main control board increases with the increase of negotiation and setup of tunnels and the increase of packets. That reduces the service throughput of the whole architecture and the efficiency of processing the packets.

SUMMARY

The embodiments provide a method, an apparatus, and a system for processing packets to improve service throughput and efficiency of processing packets.

A packet processing method provided in an embodiment is applied to a distributed packet processing system with multiple service boards. The distributed packet processing system includes a main control board, at least one service board with at least one Central Processing Unit (CPU), and at least one interface board. The method includes:

receiving a packet;

determining a first specified Central Processing Unit (CPU) to process the received packet; and sending the received packet to the first CPU to process.

A packet processing system provided in an embodiment includes a main control board, at least one interface board, and at least one service board. The system includes:

the main control board, is configured to configure information needed to the packet processing and send the information to the interface board and the service board to process the packet;

the interface board, is configured to receive packet, determine a first specified CPU to process the packet and send the packet to the determined first specified CPU to process; and the service board includes at least one CPU, wherein the determined first specified CPU is configured to process the packet.

Through the embodiments, the received packets are processed in the service board corresponding to the specified CPU. Therefore, the packets are evenly distributed to all service boards for being processed, the workload of the main control board is relieved, the service throughput is increased significantly, and the packet processing efficiency of the whole architecture is improved.

DETAILED DESCRIPTION OF THE EMBODIMENTS

The following detailed description is directed to the technical solution in the embodiments with reference to the accompanying drawings. However, the embodiments to be described are only a part of, rather than all of, the embodiments. Additionally, all other embodiments, which can be derived by those skilled in the art from the embodiments given herein without any creative efforts, fall within the scope of the claims.

A packet processing method provided in the first embodiment is applied to a distributed architecture of multiple service boards. The distributed architecture includes a main control board, at least one service board, and at least one interface board. The method includes:

determining a specified CPU corresponding to a received packet; and by a service board corresponding to the CPU, processing the received packet.

Through the embodiment, the received packets are processed in the service board corresponding to the specified CPU. Therefore, the packets are evenly distributed to all service boards for being processed, the workload of the main control board is relieved, the service throughput is increased significantly, and the packet processing efficiency is improved.

Figure 1:
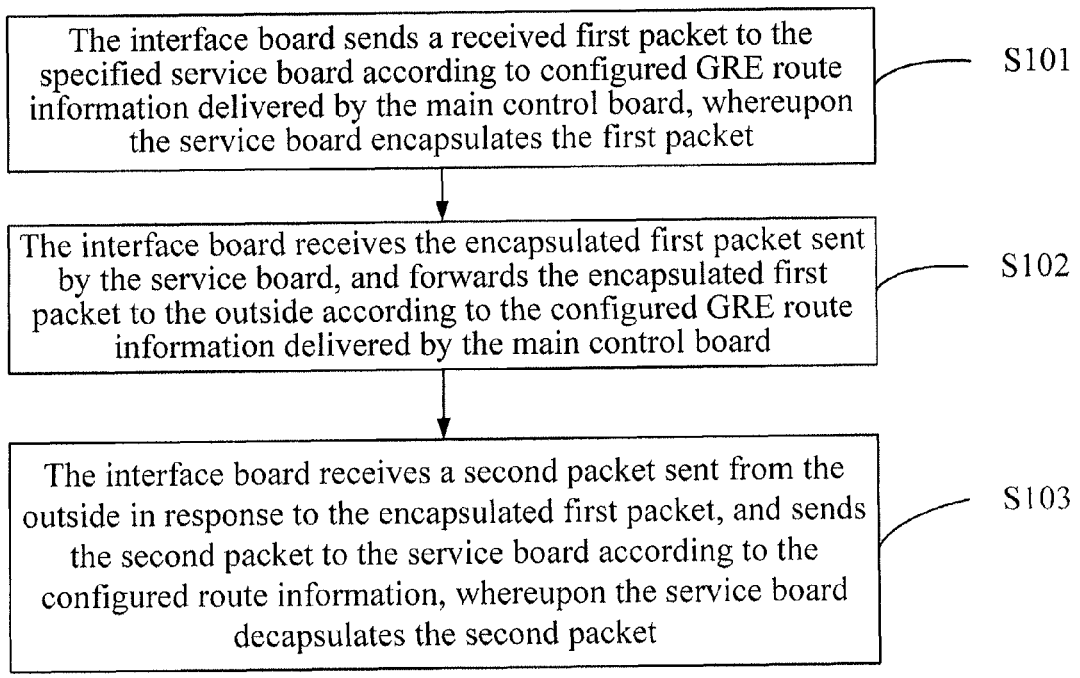
FIG. 1 is a flowchart of a packet processing method provided in the second embodiment.

FIG. 1 is a flowchart of a packet processing method provided in the second embodiment. As shown in FIG. 1, the method includes the following steps:

S101: The interface board sends the received first packet to the specified service board according to configured GRE route information delivered by the main control board, whereupon the service board encapsulates the first packet.

The GRE route information includes: next hop of the route, egress interface, ID of the CPU in charge of processing the GRE packet, and ID of the tunnel.

S102: The interface board receives an encapsulated first packet sent by the service board, and forwards the encapsulated first packet to the outside according to the configured GRE route information delivered by the main control board. "Outside" refers to the destination address of the first packet.

S103: The interface board receives a second packet sent from the outside in response to the encapsulated first packet, and sends the second packet to the service board according to the configured route information. The service board decapsulates the second packet. "Outside" refers to the source address of the second packet.

Through this embodiment, when plenty of packets pass through a device, the interface board sends different packets to different service boards according to the configured GRE route information. Therefore, the packets are evenly distributed to all the service boards for being processed, it is prevented that plenty of packets sent to the main control boards simultaneously wait for being processed, and the packet processing efficiency is improved.

A packet processing method is provided in the second embodiment. This method is applied to GRE tunnel encapsulation services. The data streams to be encapsulated depend on the source address and the destination address of the tunnel. When a tunnel is configured by the main control board, the information required for encapsulating the packets is broadcast to all service boards. In this way, the packet received by the interface board can be encapsulated or decapsulated correctly regardless of the CPU to which the packet is forwarded. Specifically, in this embodiment, the CPUs on each service board are allocated IDs, and then the IP addresses on both ends of the tunnel undergo hash calculation, and the corresponding CPU is selected according to the hash index. The IP addresses on both ends of the tunnel are fixed, and therefore, the packets encapsulated and decapsulated on different tunnels are routed onto the corresponding CPUs according to the hash index, and the packets that enter a tunnel and leave the tunnel are processed by the same CPU.

Figure 2:
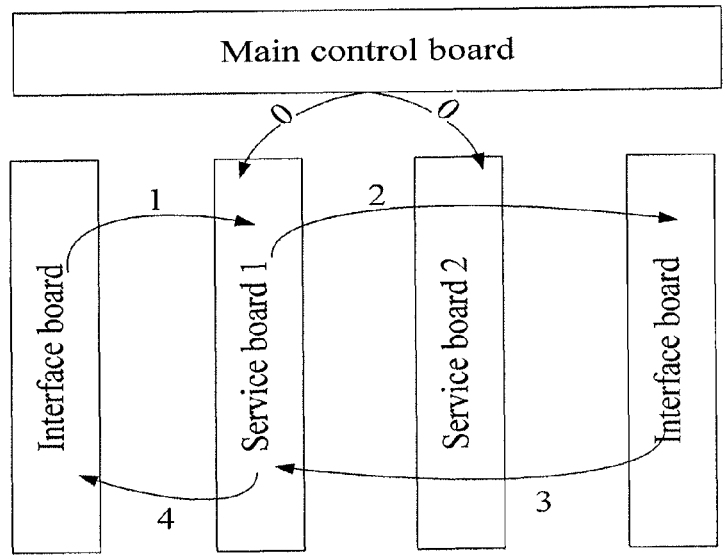
FIG. 2 shows a data flow of forwarding packets between devices in the second embodiment.

The data streams forwarded between devices in this method are shown in FIG. 2, in which data stream 0 is a configuration data stream delivered by the main control board to the service board; data stream 1 is a stream sent to the service board for encapsulation; data stream 2 is a stream which is sent to the interface board after being encapsulated on the service board; data stream 3 is a stream sent by the interface board to the service board for being decapsulated; and data stream 4 is a stream which is forwarded to the interface board after being decapsulated by the service board.

Figure 3:
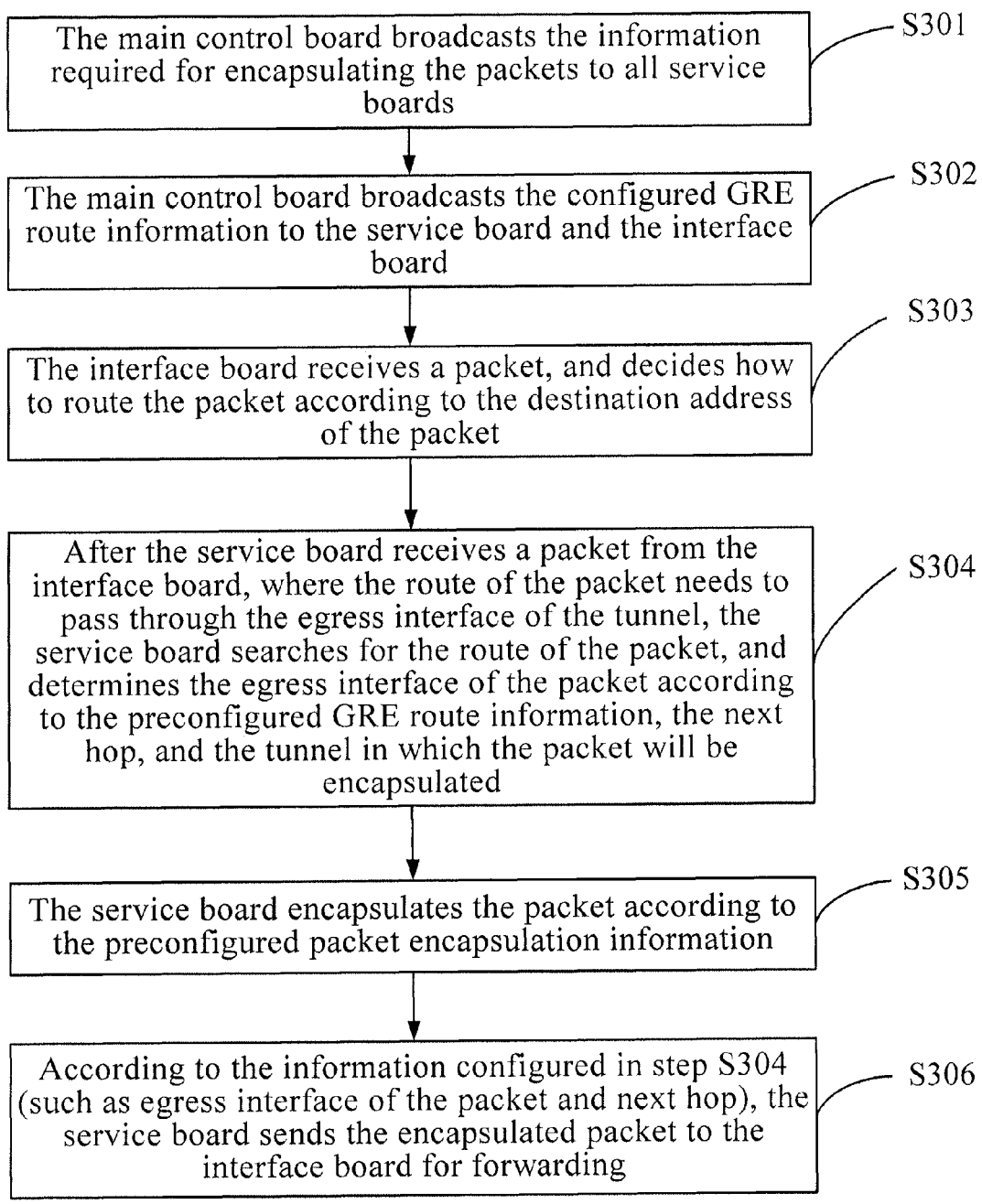
FIG. 3 is a flowchart of a packet forwarding method in the second embodiment.

FIG. 3 is a flowchart of encapsulating and forwarding packets in network communication in the second embodiment. As shown in FIG. 3, the flowchart includes the following steps:

S301: The main control board broadcasts the information required for encapsulating the packets to all service boards.

The main control board is responsible for configuration management of all devices in the distributed architecture of multiple service boards.

The information required for encapsulating packets include a source IP address of the tunnel, a destination IP address of the tunnel, an IP address of the tunnel interface, a checksum, and authentication keywords.

S302: The main control board broadcasts the configured GRE route information to the service board and the interface board.

In this step, the GRE route information not only includes the next hop of the route and the egress interface, but also includes the ID of the CPU in charge of processing the GRE packet and the ID of the tunnel.

S303: The interface board receives a packet, and decides how to route the packet according to the destination address of the packet.

In this step, the packet may be routed in the following modes:

(1) When it is found that the route to the destination address of the packet passes through the egress interface of the tunnel, the interface board obtains the CPU ID corresponding to the packet according to the configured GRE route information, and sends the packet to the service board corresponding to the CPU.

(2) If the packet is directed to the local device, the interface board performs hash calculation on the basis of the source address and the destination address of the packet, and calculates out the service board in charge of processing the packet. That ensures the same packet to be processed on the same CPU, avoids packet loss caused by failure of finding the session information when the same packet is processed on different CPUs, and avoids the trouble of forwarding packets between CPUs when all packets undergo the hash calculation.

S304: After the service board receives a packet from the interface board, where the route of the packet needs to pass through the egress interface of the tunnel, the service board searches for the route of the packet, and determines the egress interface of the packet according to the preconfigured GRE route information, the next hop, and the tunnel in which the packet will be encapsulated.

S305: The service board encapsulates the packet according to the preconfigured packet encapsulation information.

The encapsulation of the packet is to add the information such as source address of the tunnel, destination address of the tunnel and the ID of the tunnel into the header of the packet.

S306: After the packet is encapsulated, the service board searches for the route or the packet to determine the interface and the next hop according to the information such as the egress interface and the next hop of the packet which is configured in step S304, and sends the encapsulated packet to the interface board which will forward the packet.

Figure 4:
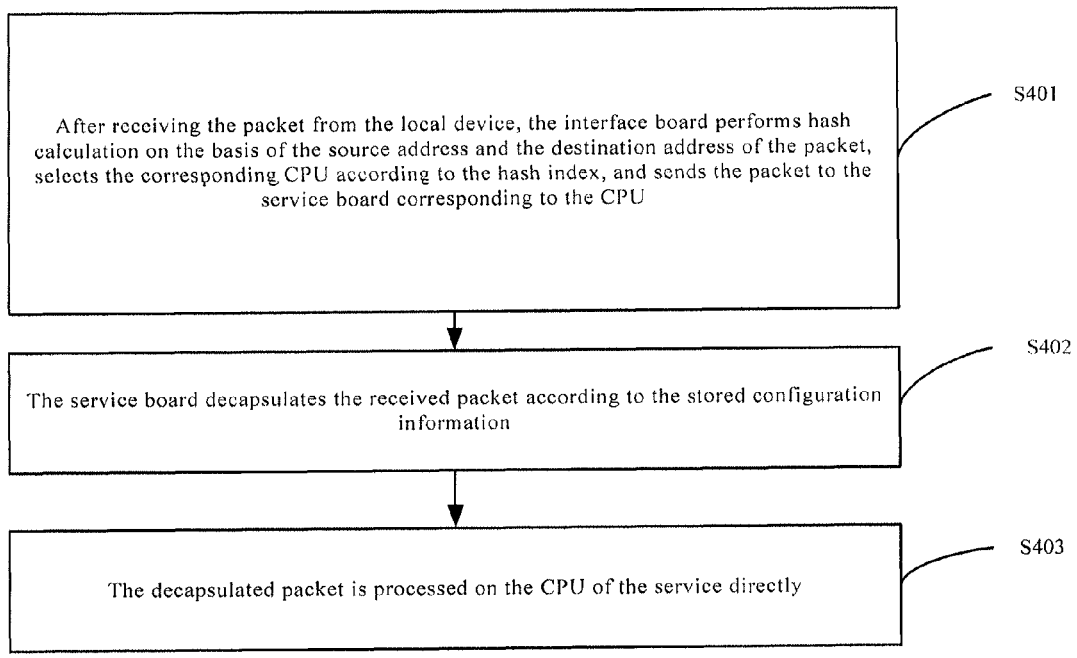
FIG. 4 is another flowchart of a packet forwarding method in the second embodiment.

As shown in FIG. 4, the process of decapsulating a received packet includes the following steps:

S401: After receiving the packet from the local device, the interface board performs hash calculation on the basis of the source address and the destination address of the packet, selects the corresponding CPU according to the hash index, and sends the packet to the service board corresponding to the CPU.

S402: The service board decapsulates the received packet according to the stored configuration information.

The details of the configuration information are the source address of the tunnel, destination address of the tunnel, IP address of the tunnel interface, ID of the tunnel, and so on.

More specifically, the decapsulation process is to judge whether the source address of the GRE protocol packet, the destination address of the GRE protocol packet and the tunnel ID are the source address, destination address and ID of this tunnel respectively; and, if such is the case, remove the source address of the GRE protocol packet, the destination address of the GRE protocol packet, and the tunnel ID; otherwise, discard the GRE protocol packet.

S403: The decapsulated packet is processed on the CPU of the service board.

Through the foregoing steps, the load is shared in a sophisticated multi-core environment of multiple service boards.

Through the method provided in the second embodiment, it is prevented that a large number of packets are sent to the main control board simultaneously and wait for being processed, the processing efficiency is improved, and the CPU resources of the main control board are saved. Moreover, the GRE packets that enter a tunnel and the GRE packets that leave the tunnel are processed in the same CPU, thus keeping consistency of session information.

Figure 5:
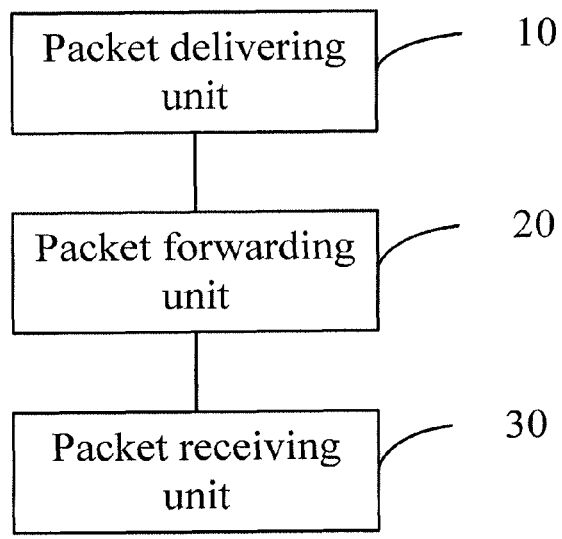
FIG. 5 shows a structure of an interface board in the third embodiment.

FIG. 5 shows a structure of an interface board in the third embodiment. As shown in FIG. 5, the interface board is applied to a system which includes a main control board, at least one interface board, and a service board. The interface board includes:

a packet delivering unit 10, configured to send a received first packet to a specified service board according to configured GRE route information delivered by the main control board;

a packet forwarding unit 20, configured to: receive an encapsulated first packet sent by the service board, and forward the encapsulated first packet to the outside according to the configured GRE route information delivered by the main control board; and a packet receiving unit 30, configured to: receive a second packet sent from the outside in response to the encapsulated first packet, and send the second packet to the service board according to the configured route information.

Figure 6:
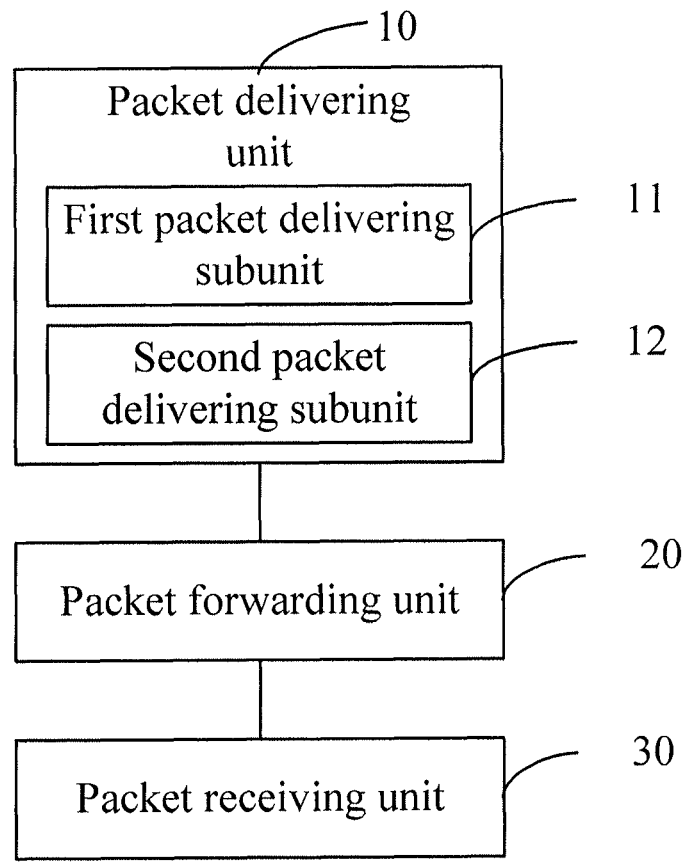
FIG. 6 shows a structure of an interface board in the fourth embodiment.

FIG. 6 shows a structure of an interface board in the fourth embodiment. As shown in FIG. 6, on the basis of the third embodiment, the packet delivering unit 10 further includes:

a first packet delivering subunit 11, configured to: obtain the CPU ID corresponding to the first packet according to the configured GRE route information after the interface board finds that the route of the received first packet needs to pass through the egress interface of the tunnel, and send the first packet to the service board; and a second packet delivering subunit 12, configured to: perform hash calculation on the basis of the source IP address and the destination IP address of the received first packet after the interface board finds that the first packet is sent from the local device, calculate out the service board in charge of processing the first packet, and send the first packet.

Figure 7:
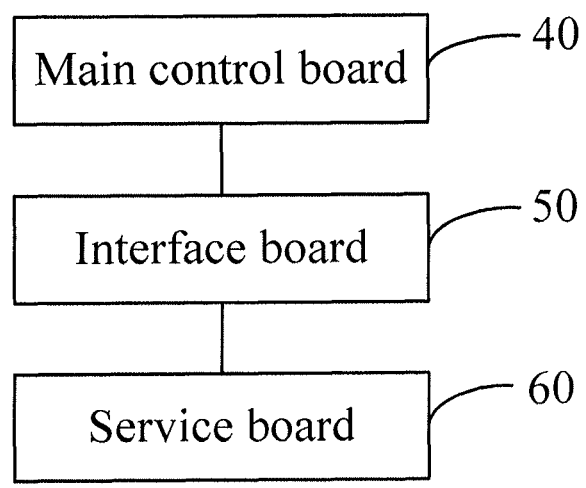
FIG. 7 shows a structure of a packet processing system provided in the fifth embodiment.

FIG. 7 shows a structure of a packet processing system provided in the fifth embodiment. As shown in FIG. 7, the packet processing system includes:

a main control board 40, configured to deliver information required for encapsulating a packet and configured GRE route information;

at least one interface board 50, configured to: send the received first packet to the service board 60 according to the configured GRE route information delivered by the main control board 40, whereupon the service board 60 encapsulates the first packet; receive the encapsulated first packet sent by the service board 60, and forward the encapsulated first packet to the outside according to the configured GRE route information delivered by the main control board 40; and, after receiving a second packet sent from the outside in response to the encapsulated first packet, route the second packet to the service board 60 according to the configured route information, whereupon the service board 60 decapsulates the second packet; and a service board 60, configured to encapsulate and decapsulate the packet sent by the interface board 50.

Through the devices and the system provided in this embodiment, the packets are evenly distributed to the service boards for being processed; it is prevented that a large number of packets are sent to the main control board simultaneously and wait for being processed, the forwarding efficiency is improved, and the CPU resources of the main control board are saved. Moreover, the GRE packets that enter a tunnel and the GRE packets that leave the tunnel are processed in the same CPU, thus keeping consistency of session information.

Figure 8:
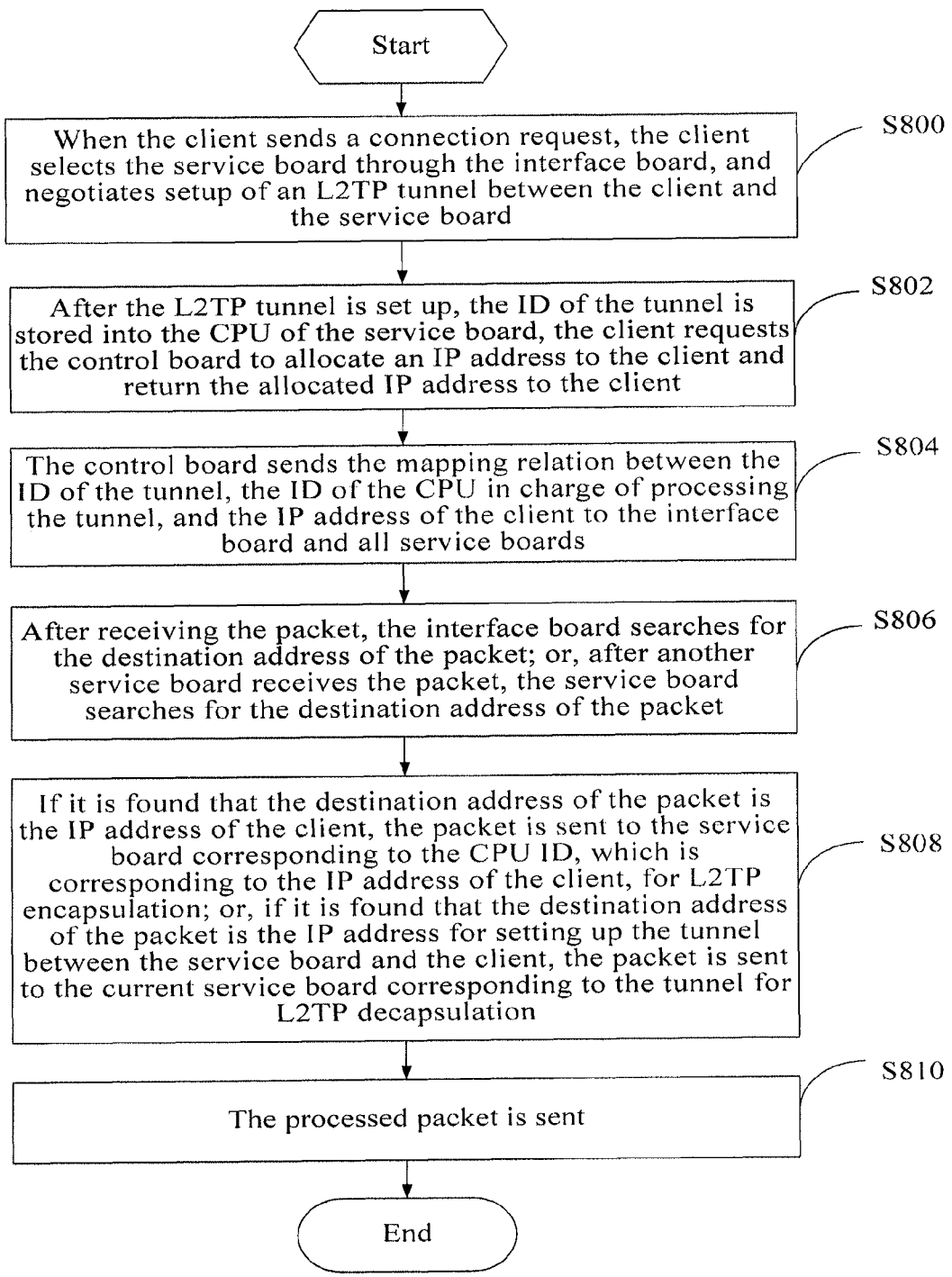
FIG. 8 is a flowchart of a packet processing method provided in the sixth embodiment.

FIG. 8 is a flowchart of a packet processing method provided in the sixth embodiment. As shown in FIG. 8, in the sixth embodiment, the method is applied to network devices in a distributed architecture of multiple service boards. In the distributed architecture, a main board, an interface board and multiple service boards exist; the main control board is connected to the interface board and the service boards, and the interface board is connected to every service board. The network devices in the distributed architecture are externally connected to a client and a network.

Step S800: When the client sends a connection request, the client selects the service board through the interface board, and negotiates setup of an L2TP tunnel between the client and the service board. In the sixth embodiment, the client sends a negotiation packet of the connection request to the interface board; the interface board performs hash calculation on the basis of the source address and the destination address in the negotiation packet in order to select one of the service boards; and then the selected service board negotiates with the client to set up an L2TP tunnel between the client and the service board. In the sixth embodiment, the destination addresses in the negotiation packet of the connection request are the IP addresses on both ends of the tunnel. The interface board can search out the service board in charge of processing the packets sent by this client according to the IP addresses on both ends of the tunnel, and then the service board can negotiate with the client to set up a tunnel corresponding to the IP addresses.

Step S802: After the L2TP tunnel is set up, the ID of the tunnel is stored into the CPU of the service board, the client requests the main control board to allocate an IP address to the client and return the allocated IP address and the tunnel ID to the client. In the sixth embodiment, after setting up the tunnel corresponding to the IP address successfully, the service board assigns an ID to the tunnel.

Step S804: The main control board sends the mapping relation between the ID of the tunnel, the ID of the CPU in charge of processing the tunnel, and the IP address of the client to the interface board and all service boards.

Step S806: After receiving the packet, the interface board searches for the destination address of the packet; or, after another service board receives the packet, the service board searches for the destination address of the packet. In the sixth embodiment, after an L2TP tunnel is set up between the client and the service board, the interface board may receive a packet which is sent by the client to the network and needs to undergo L2TP decapsulation, and, in this case, the destination address is the IP address of the tunnel. Alternatively, the interface board may receive a packet which is returned by the network to the client and needs to undergo L2TP encapsulation, and, in this case, the destination address is the IP address of the client. Meanwhile, the packets received by other service boards may the packets returned by the network to the client, and, in this case, the destination address is the IP address of the client. In the sixth embodiment, after receiving a packet, other service boards may handle the Network Address Translation (NAT) service of the packet or handle other services except L2TP decapsulation and L2TP encapsulation. After the service boards finish processing this service, the service boards need to search out the destination address of the packet when handling the L2TP encapsulation.

Step S808: If it is found that the destination address of the packet is the IP address of the client, the packet is sent to the service board corresponding to the CPU ID, which is corresponding to the IP address of the client, for L2TP encapsulation; or, if it is found that the destination address of the packet is the IP address for setting up the tunnel between the service board and the client, the packet is sent to the current service board corresponding to the tunnel for L2TP decapsulation. In the sixth embodiment, the service board in charge of processing the packet is searched out through hash calculation performed according to the source address and the destination address of the packet. The step of hash calculation for searching out the service board in charge of processing the packet is similar to step S800. After the service board is found, the service board obtains the ID of the tunnel from the header information of the packet, and selects the CPU corresponding to the ID of the tunnel for L2TP decapsulation. That is, the corresponding service board is found according to the IP addresses on both ends of the tunnel of the packet. In this case, the IP addresses on both ends of the tunnel of the packet are the IP addresses on both ends of the tunnel in the negotiation process described in step S800.

In the sixth embodiment, if the interface board finds that the destination address of the received packet is the IP address of the client, or, if another service board finds that the destination address of the received packet is the IP address of the client, the packet needs to be sent to the service board corresponding to the CPU ID, which is corresponding to the IP address of the client, for L2TP encapsulation; or, if the interface board finds that the destination address of the packet is the IP address of the tunnel, it is necessary to search out the service board in charge of processing the packet through hash calculation performed according to the source address and the destination address of the packet, and the packet undergoes L2TP decapsulation.

Step S810: The interface board sends the processed packet. In the sixth embodiment, the interface board sends the packet after L2TP encapsulation to the client corresponding to the IP address, or sends the packet after L2TP decapsulation to the network.

In the packet processing method provided in the sixth embodiment, a tunnel is set up through negotiation between the current service board and the client; the mapping relation between the tunnel ID, the CPU ID of the service board, and the IP address of the client is sent to the interface board and all service boards; after receiving a packet directed to the client, the interface board or another service board sends the packet to the CPU of the current service board corresponding to the tunnel ID for L2TP encapsulation according to the mapping relation; after receiving a packet directed to the network, the interface board searches out the current service board which previously negotiates to set up the tunnel according to the IP address of the tunnel of the packet, and sends the packet to the CPU of the current service board for L2TP decapsulation. In this way, the packets that need L2TP encapsulation and L2TP decapsulation from the same client are processed in the CPU of the same service board, the workload of the main control board is relieved, the L2TP service throughput is improved significantly, and the packet processing efficiency of the whole architecture is improved.

Figure 9:
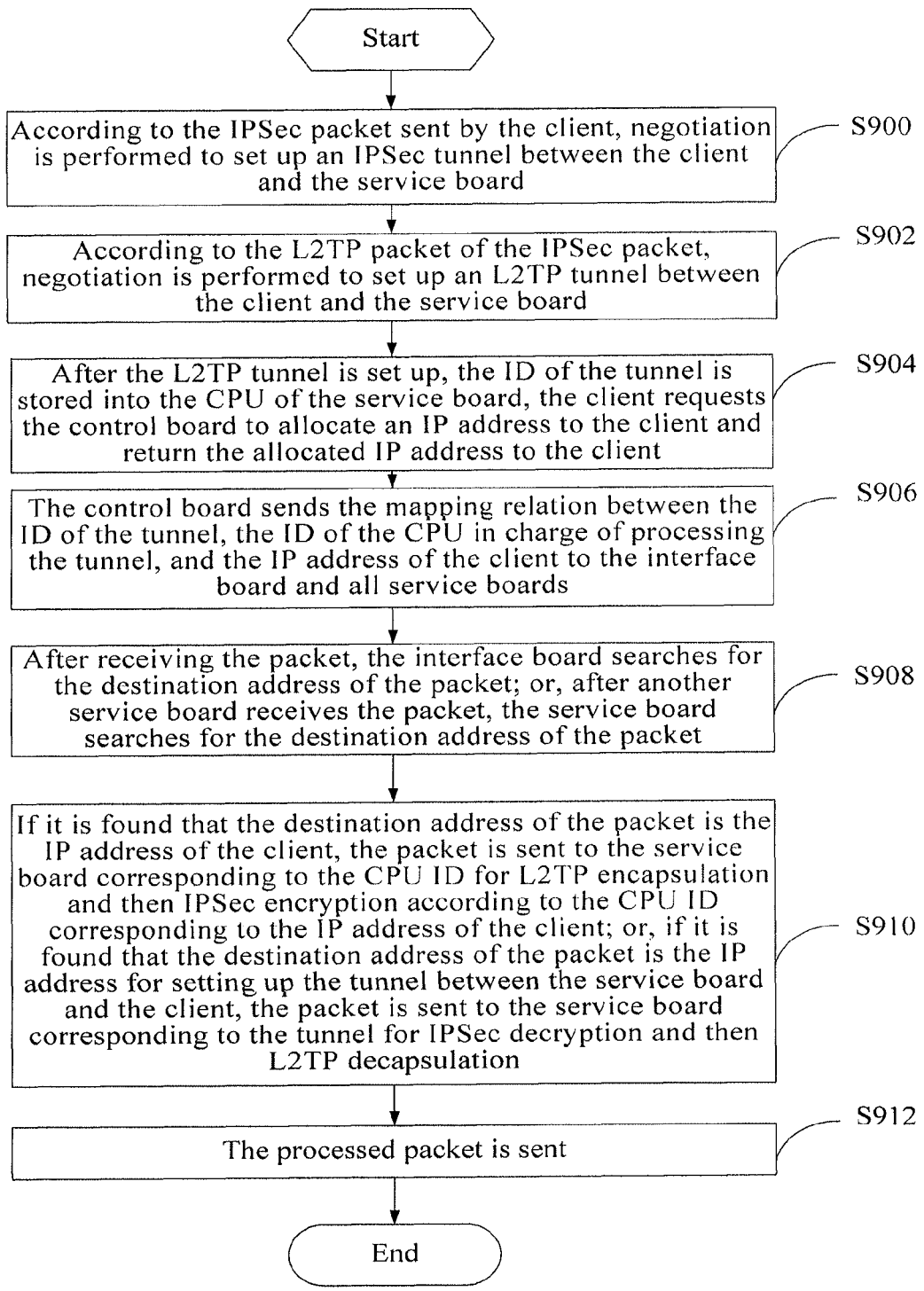
FIG. 9 is a flowchart of a packet processing method provided in the seventh embodiment.

FIG. 9 is a flowchart of a packet processing method provided in the seventh embodiment. As shown in FIG. 9, the method includes the following steps:

Step S900: According to the IPSec packet sent by the client, negotiation is performed to set up an IPSec tunnel between the client and the service board.

Step S902: According to the L2TP packet of the IPSec packet, negotiation is performed to set up an L2TP tunnel between the client and the service board.

Steps S904, S906, and S908 are similar to steps S802, S804, and S806 in FIG. 8 respectively.

Step S910: If it is found that the destination address of the packet is the IP address of the client, the packet is sent to the service board corresponding to the CPU ID for L2TP encapsulation and then IPSec encryption according to the CPU ID corresponding to the IP address of the client; or, if it is found that the destination address of the packet is the IP address for setting up the tunnel between the service board and the client, the packet is sent to the service board corresponding to the tunnel for IPSec decryption and then L2TP decapsulation. In the seventh embodiment, the service board in charge of processing the packet is searched out through hash calculation performed according to the source address and the destination address of the packet. The step of hash calculation for searching out the service board in charge of processing the packet is similar to step S902. After the service board is found, the service board obtains the ID of the tunnel from the header information of the packet, and selects the CPU corresponding to the ID of the tunnel, and the packet is sent to the service board corresponding to the CPU ID for IPSec decapsulation and then L2TP decapsulation. That is, the corresponding service board is found according to the IP addresses on both ends of the tunnel of the packet. In this case, the IP addresses on both ends of the tunnel of the packet are the IP addresses on both ends of the tunnel in the negotiation process described in step S902.

In the seventh embodiment, if the interface board finds that the destination address of the received packet is the IP address of the client, or, if another service board finds that the destination address of the received packet is the IP address of the client, the packet needs to be sent to the service board corresponding to the CPU ID for being processed according to the CPU ID corresponding to the IP address of the client; or, if the interface board finds that the destination address of the packet is the IP address of the tunnel, it is necessary to search out the service board in charge of processing the packet through hash calculation performed according to the source address and the destination address of the packet, and the packet is processed in the searched service board. In the seventh embodiment, after receiving a packet, other service boards may handle the NAT service of the packet or handle other services except L2TP decapsulation, L2TP encapsulation, IPSec decryption and IPSec encryption. After the service boards finish processing this service, such as the NAT service, the service boards need to search out the destination address of the packet when the L2TP encapsulation is needed.

Step S912: The processed packet is sent. In the seventh embodiment, the interface board sends the packet after L2TP encapsulation and IPSec encryption to the client corresponding to the IP address, or sends the packet after IPSec decryption and L2TP decapsulation to the network.

In the packet processing method provided in the seventh embodiment, a tunnel is set up through negotiation between the current service board and the client; the mapping relation between the tunnel ID, the CPU ID of the service board, and the IP address of the client is sent to the interface board and all service boards; after receiving a packet directed to the client, the interface board or another service board sends the packet to the CPU of the current service board corresponding to the tunnel ID for L2TP encapsulation and then IPSec encryption according to the mapping relation; after receiving a packet directed to the network, the interface board searches out the current service board which previously negotiates to set up the tunnel according to the IP address of the tunnel in the packet, and sends the packet to the CPU of the current service board for IPSec decryption and then L2TP decapsulation. In this way, the packets that need L2TP encapsulation, IPSec encryption, IPSec decryption, and L2TP decapsulation from the same client are processed in the CPU of the same service board, the workload of the main control board is relieved, the throughput of the L2TP service and the IPSec service is improved significantly, and the packet processing efficiency of the L2TP+IPSec networking is improved.

Figure 10:
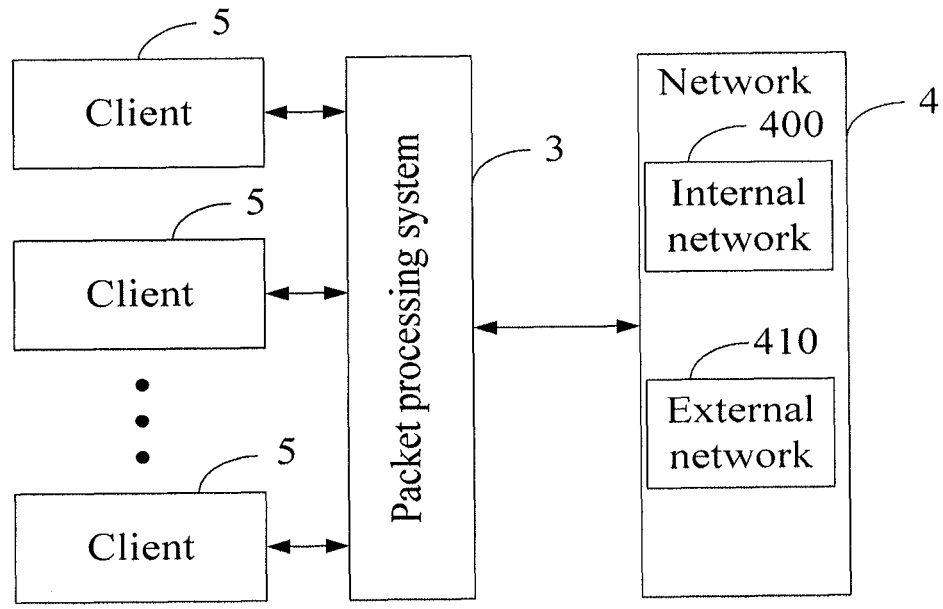
FIG. 10 shows an application environment of a packet processing system provided in the eighth embodiment.

FIG. 10 shows an application environment of a packet processing system provided in the eighth embodiment. In this embodiment, the packet processing system 3 is communicationally connected with multiple clients 5 and a network 4; the network 4 includes an internal network 400 and an external network 410; the internet network 400 may be an internal network of an enterprise, and the external 410 may be a non-enterprise internal network. In this embodiment, the packet sent by client 5 may be a packet for accessing the internal network of the enterprise, or a packet for accessing an external network.

Figure 11:
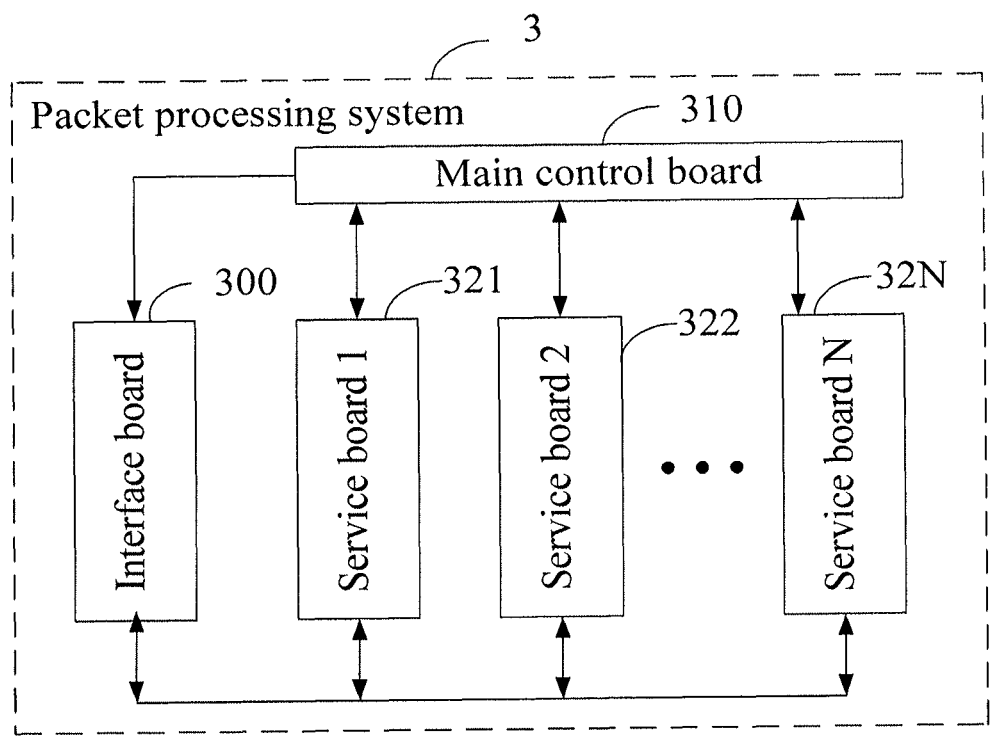
FIG. 11 shows a structure of a packet processing system provided in the eighth embodiment.

FIG. 11 shows a structure of a packet processing system provided in the eighth embodiment. In this embodiment, the packet processing system 3 includes an interface board 300, a main control board 310, a first service board 321, a second service board 322, ..., and an N service board 32N. Through the packet processing system 3, the packets sent by the network to the client and received by the interface board 300 for L2TP encapsulation as well as the packets sent by the client to the network for L2TP decapsulation are processed in the CPU of the same service board. In this embodiment, the first service board 321, the second service board 322, ..., and the N service board 32N have the same structure. The following description takes the first service board 321 as an example.

The interface board 300 selects one of the N service boards according to the connection request sent by the client. In this embodiment, the interface board 300 selects the first service board 321.

The first service board 321 is configured to: negotiate to set up an L2TP tunnel between the first service board 321 and the client, store the ID of the L2TP tunnel into an internal CPU, and request the main control board 310 to allocate an IP address to the client and return the allocated IP address to the client.

The first service board 321 is further configured to send the ID of the tunnel, the ID of the CPU in charge of processing the tunnel, and the IP address allocated to the client to the main control board 310.

The main control board 310 is configured to send the mapping relation between the ID of the tunnel, the ID of the CPU in charge of processing the tunnel, and the IP address allocated to the client and the first service board 321, the second service board 322, ..., and the N service board 32N, where the mapping relation is sent by the first service board 321.

The interface board 300 is further configured to search for the destination address of a packet after receiving the packet sent by the client or the network. In this embodiment, if it is found that the destination address of the packet is the IP address of the client, namely, if the packet is sent by the network to the client, the interface board 300 sends the packet to the service board corresponding to the CPU ID, which is corresponding to the IP address, for L2TP encapsulation, namely, sends the packet to the first service board 321 for L2TP encapsulation; if it is found that the destination address of the packet is the IP address for setting up the tunnel between the service board and the client, the interface board 300 sends the packet to the service board corresponding to the tunnel for L2TP decapsulation, namely, sends the packet to the first service board 321 for L2TP decapsulation.

The second service board 322, ..., or the N service board 32N is also further configured to search for the destination address of a packet after receiving the packet. In this embodiment, after receiving a packet, the second service board 322, ..., or the N service board 32N may handle the NAT service of the packet or handle other services except L2TP decapsulation, L2TP encapsulation, IPSec decryption and IPSec encryption. After completion of handling a service, such as the NAT service, the second service board 322, ..., or the N service board 32N needs to search for the destination address of the packet when L2TP encapsulation needs to be handled.

In this embodiment, if it is found that the destination address of the packet is the IP address of the client, namely, if the packet is sent by the network to the client, the service board in charge of processing the NAT service packet sends the packet to the service board corresponding to the CPU ID, which is corresponding to the IP address, for L2TP encapsulation, namely, sends the packet to the first service board 321 for L2TP encapsulation.

The interface board 300 is further configured to send the packet processed by the first service board 321. In this embodiment, the interface board 300 sends the packet encapsulated by the first service board 321 through L2TP to the client, or sends the packet decapsulated by the first service board 321 through L2TP to the network.

In this embodiment, the first service board 321 is further configured to: negotiate to set up an IPSec tunnel between the client and the service board according to the IPSec packet sent by the client, and negotiate to set up an L2TP tunnel between the client and the service board according to the L2TP packet of the IPSec packet.

In this embodiment, the interface board 300 further serves the following purposes: if it is found that the destination address of the packet is the IP address of the client, namely, if the packet is sent by the network to the client, the interface board 300 sends the packet to the service board corresponding to the CPU ID for L2TP encapsulation and then IPSec encryption according to the CPU ID corresponding to the IP address, namely, sends the packet to the first service board 321 for L2TP encapsulation and then IPSec encryption; if it is found that the destination address of the packet is the IP address for setting up the tunnel between the service board and the client, the interface board 300 sends the packet to the service board corresponding to the tunnel for IPSec decryption and then L2TP decapsulation, namely, sends the packet to the first service board 321 for IPSec decryption and then L2TP decapsulation.

In this embodiment, the second service board 322, . . . , or the N service board 32N further serves the following purposes: if it is found that the destination address of the packet is the IP address of the client, namely, if the packet is sent by the network to the client, the service board sends the packet to the service board corresponding to the CPU ID for L2TP encapsulation and then IPSec encryption according to the CPU ID corresponding to the IP address, namely, sends the packet to the first service board 321 for L2TP encapsulation and then IPSec encryption.

The interface board 300 is further configured to: send the packet which has undergone L2TP encapsulation and IPSec encryption performed by the first service board 321 to the client, or send the packet which has undergone IPSec decryption and L2TP decapsulation performed by the first service board 321 to the network.

In the packet processing system provided in this embodiment, a tunnel is set up through negotiation between the current service board and the client; the mapping relation between the tunnel ID, the CPU ID of the service board, and the IP address of the client is sent to the interface board and all service boards; after receiving a packet directed to the client, the interface board or another service board sends the packet to the CPU of the current service board corresponding to the tunnel ID for L2TP encapsulation and then IPSec encryption according to the mapping relation; after receiving a packet directed to the network, the interface board searches out the current service board which previously negotiates to set up the tunnel according to the IP address of the tunnel of the packet, and sends the packet to the CPU of the current service board for IPSec decryption and then L2TP decapsulation. In this way, the packets that need L2TP encapsulation, IPSec encryption, IPSec decryption, and L2TP decapsulation from the same client are processed in the CPU of the same service board, the workload of the main control board is relieved, the throughput of the L2TP service and the IPSec service is improved significantly, and the packet processing efficiency of the L2TP+IPSec networking is improved.

Figure 12:
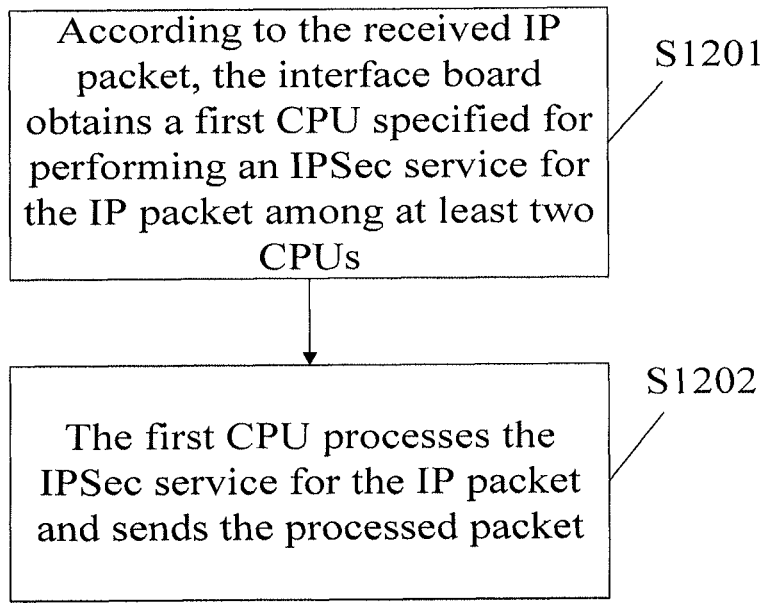
FIG. 12 is a flowchart of a packet processing method provided in the ninth embodiment.

FIG. 12 is a flowchart of a packet processing method provided in the ninth embodiment. The method is based on at least two CPUs. As shown in FIG. 12, the method includes the following steps:

Step S1201: According to the received IP packet, the interface board obtains a first CPU which is specified for performing an IPSec service for the received IP packet among at least two CPUs.

The first CPU is a specified CPU.

Step S1202: The first CPU processes the IPSec service for the IP packet and sends the processed packet.

In the technical solution provided in the ninth embodiment, the first CPU in charge of processing the IPSec service for the IP packet is obtained according to the IP packet, and the CPU corresponding to the IP packet implements the IPSec service for the IP packet, thus relieving the workload of the main control board and improving the packet processing efficiency; and different CPUs are used to share load of the IP packets, thus enabling the IPSec service in a high-end VPN device that includes multiple CPUs.

A packet processing method provided in the 10th embodiment is elaborated below.

In this embodiment, the words such as "first" and "second" are used to differentiate between the CPUs for processing the same IP packet, but not to limit the number of the CPUs. The functions of the first CPU and the second CPU are described below.

As physical entities on the VPN device, the first CPU and the second CPU described below has the same structure or functions, and may be any CPU on the service board, the similar being applicable hereinafter.

Figure 13:
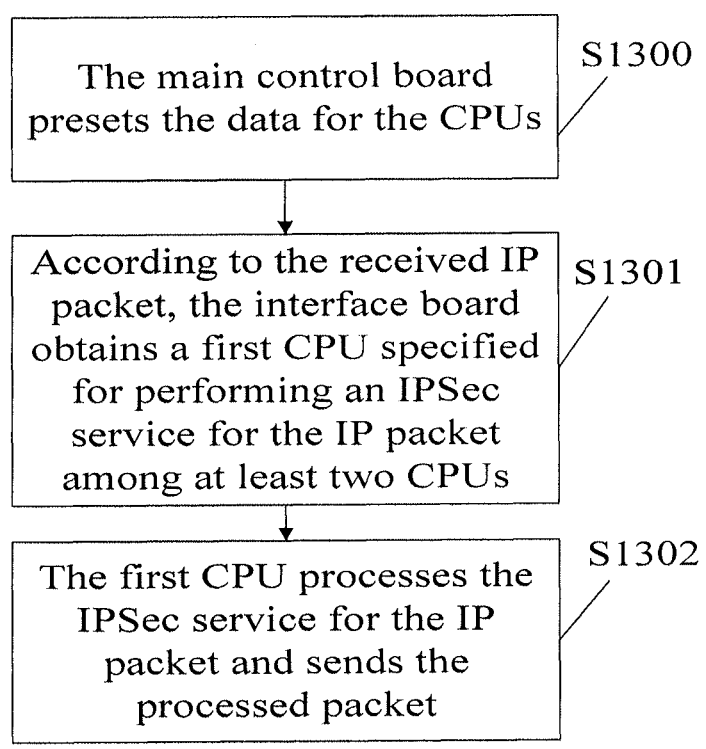
FIG. 13 is a flowchart of a packet processing method provided in the 10th embodiment.

FIG. 13 is a flowchart of a packet processing method provided in the 10th embodiment. The method is based on at least two CPUs. As shown in FIG. 13, the method includes the following steps:

Step S1301: According to the received IP packet, the interface board obtains a first CPU specified for performing an IPSec service for the IP packet among at least two CPUs.

Figure 14:
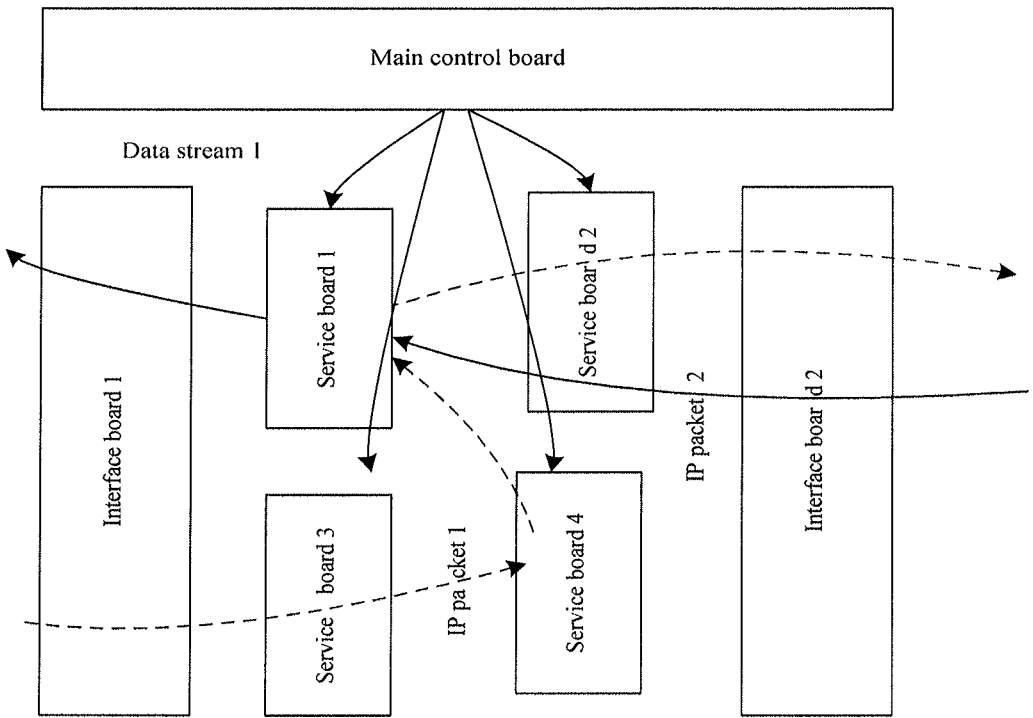
FIG. 14 is a schematic diagram of a packet processing method provided in the 10th embodiment.

As shown in FIG. 14, service boards 1-4 and interface boards 1-2 exist in the 10$^{th}$ embodiment. In practice, the number of the service boards and the number of the interface boards are not limited, it is possible that one service board exists and this service board includes multiple CPUs; or multiple service boards exist, and the CPUs are distributed on the multiple service boards. There may be one or more interface boards. The following description supposes that the first interface board or the second interface board serves as an ingress of the IP packet. The packet processing method comes in two scenarios:

The first scenario is that the IP packet needs to be encapsulated. In this scenario, the packet processing method includes the following steps:

Step S1301A: The interface board obtains the second CPU according to the IP packet to be encapsulated.

The first interface board is an ingress of the IP packet (IP packet 1) to be encapsulated, and receives the IP packet from a data sending client. The IP packet carries the source IP address and the destination IP address of the data sending client and the data receiving client of the IP packet. In the 10th embodiment, the first interface board obtains a second CPU according to the source IP address and the destination IP address carried in the IP packet, as detailed below:

In the 10$^{th}$ embodiment, the source IP address and the destination IP address carried in the IP packet undergo hash transformation first, and a hash index value of the IP packet is obtained. Preferably, the hash transformation method applied in the 10th embodiment includes the following steps:

Step S1301a: Shift the sum of the source IP address and the destination IP address rightward by 16 bits, and obtain the first parameter X1, namely, X1=(source IP+destination IP) & 16.

Perform an AND operation for 1 and the sum of the source IP address and the destination IP address to obtain a second parameter X2, namely, X2=(source IP+destination IP) & 0xFFFF.

Step S1301b: Perform an OR operation for the first parameter X1 and the second parameter X2 to obtain a third parameter X3, namely, X3=X1^X2.

Step S1301c: Shift the third parameter X3 rightward by 1 bit, and perform an AND operation for 1 and the last 6 bits in the value obtained after the shift, thus obtaining a fourth parameter X4, namely, X4=(X3>>1) & 0x3F.

Use the fourth parameter X4 obtained in S1301a-S1301c as a hash index value of the IP packet.

Afterward, map the hash index value of the IP packet to different CPUs on the service boards. Therefore, the corresponding second CPU can be obtained according to the IP packet that needs to be encapsulated.

The hash index value obtained above (namely, the fourth parameter) generally ranges from 0 to 63. The mapping relation between the IP packet and the second service board is described below, supposing that each service board includes two CPUs.

The IP packet may be mapped to the second CPU in many ways, and therefore, the second CPU on the service board can be obtained according to the IP packet. Preferably, the mapping method provided in the 10th embodiment is as follows:

Every CPU on the service boards can serve as a second CPU. The IP packet is forwarded to the corresponding first CPU, and the data quantity of the forwarded IP packet is random. Preferably in the second embodiment, the hash index value is averagely mapped to each CPU according to the data quantity of the IP packet in order to exert the merits of the distributed multiple service boards which include multiple CPUs and improve the efficiency of processing the IPSec service. The mapping method is outlined below:

For example, an ID is assigned to each CPU. When there are a total of 160 different IP packets that need to be processed in the network, 160 different hash index values are obtained according to the IP packets, and the hash index values range from 0 to 63. The fourth service boards include 8 CPUs, which are numbered 1-8. The CPUs on the first service board are CPU1 and CPU2, the CPUs on the second service board are CPU3 and CPU4, the CPUs on the third service board are CPU5 and CPU6, and the CPUs on the fourth service board are CPU7 and CPU8.

The value range 0-63 may be divided into 8 sub-ranges averagely. The sub-ranges are: 0-7, 8-15, 16-23, 24-31, 31-38, 39-46, 47-55, and 56-63. The hash index values corresponding to the 8 sub-ranges are mapped to CPU1-CPU8 respectively.

The division method is not limited to the example above. For example, when the hash index values in a range correspond to many IP packets, if the hash index values of 60 IP packets among the 160 IP packets range from 24 to 31, the IP packets corresponding to the hash index values in this range may be mapped to two or more CPUs in order to make full use of every CPU and improve the data processing performance of the VPN device.

After receiving an IP packet from a data sending client, the first interface board obtains the hash index value of the IP packet according to the source IP address and the destination IP address in the IP packet, and can obtain the second CPU corresponding to the IP packet according to this hash index value and the foregoing mapping relation.

The dotted line in FIG. 14 indicates IP packet 1. After receiving IP packet 1, the first interface board performs hash transformation for the source IP address and the destination IP address of IP packet 1, uses the hash index value to obtain the second CPU (namely, CPU8 on the fourth service board) according to the foregoing mapping relation, and sends IP packet 1 to CPU8.

Step S1301B: The second CPU uses an Access Control List (ACL) to match the IP packet and obtain the first CPU.

The second CPU is configured to: match the IP packets from the interface board with the CPUs according to the ACL; and, if an IP packet matches a CPU, send the IP packet to the CPU for implementing the IPSec service, where the CPU is the first CPU, or, if the IP packet mismatches the CPU, send the IP packet to the interface board directly. The processing in the case of mismatch is not much related to the present invention, and will not be detailed herein any further.

In the 10th embodiment, a VPN device includes multiple CPUs is applied, the data processing capability is high, and a load sharing technology is applied to the IP packet between multiple CPUs. That is, the second CPU matches an IP packet with different preset ACL data. According to the matching result, when an IPSec service needs to be processed, the CPU in charge of processing the IPSec service corresponding to the IP packet is obtained, and this CPU is the first CPU of this IP packet. The IP packet that involves no IPSec service processing is sent out directly.

As shown in FIG. 14, the second CPU (CPU8) matches IP packet 1 with the ACL data configured on CPU8. The matching result shows whether IP packet 1 involves IPSec service processing. If IP packet 1 involves IPSec service processing, the first CPU in charge of processing the IPSec service for IP packet 1 can be obtained according to the ACL configuration.

The ACL data may be configured by the main control board.

The second scenario is that the IP packet needs to be decapsulated. In this scenario, the packet processing method includes the following steps:

Step S1301C: Hash transformation is performed for the IP addresses on both ends of the IPSec tunnel to obtain hash index values, where the IP addresses are carried in the IP packet to be decapsulated.

As shown in FIG. 14, the second interface board serves as an ingress of the IP packet (IP packet 2) to be decapsulated, the second interface board receives IP packet 2, and the IP addresses on both ends of the corresponding IP tunnel are encapsulated (through ESP encapsulation and/or AH encapsulation) in IP packet 2. For the process of performing hash transformation for the IP addresses on both ends of the IP tunnel to obtain the hash index values, see steps S1301a-S1301c above.

Step S1301D: The first CPU is obtained according to the hash index value.

Because the main control board presets the data of the CPUs, when the IP addresses on both ends of the IP tunnel of the IP packet are used as the source IP address and the destination IP address of the hash transformation, the first CPU in charge of implementing the IPSec service of the IP packet may be obtained directly according to the obtained hash index value.

The main control board presets the data for all CPUs in the following way. The following step occurs before step S1301:

Step S1300: The main control board presets the data for the CPUs, as detailed below:

Step S1300A: The main control board allocates a first CPU to the IP packet.

In the 10th embodiment, the main control board allocates a first CPU to the IP packet according to the IP addresses on both ends of the IP tunnel of the IP packet. The IP packet may be an IP packet that needs to be encapsulated or an IP packet that needs to be decapsulated.

The main control board performs hash transformation for the IP addresses on both ends of the IP tunnel to obtain a hash index value, and maps the hash index value of the IP packet to the CPU. For details, see steps S1301a-S1301c above. This method ensures that the IP packets in the same IP tunnel can be sent to the same CPU for IPSec services. That is, it is the same CPU that encapsulates and decapsulates the IP packets in the same IP tunnel.

Step S1300B: The main control board performs the corresponding ACL configuration for the first CPU corresponding to the IP packet, and sends the data required for implementing the IPSec service for the IP packet to the first CPU.

After the CPU is allocated to the IP packet, the main control board configures the ACL according to the mapping relation between the IP packet and the CPU. The ACL configuration indicates the first CPU in charge of processing the IP packets in the same IP tunnel. The main control board broadcasts the ACL data configuration to all CPUs in service boards, and sends the data required for implementing the corresponding IPSec service to the determined CPUs respectively.

In conclusion, for an IP packet that needs to be encapsulated, the interface board obtains the second CPU according to the source IP address and the destination IP address of the IP packet, and then the second CPU performs ACL matching for the IP packet according to the ACL data configured by the main control board, and sends the IP packet to the first CPU according to the matching result. Because the main control board performs ACL data configuration for the CPU according to the IP addresses on both ends of the IP tunnel of the IP packet, and obtains the first CPU according to the IP addresses on both ends of the IP tunnel directly to the IP packet that needs to be encapsulated, it is ensured that the same CPU encapsulates and decapsulates the IP packets in the same IP tunnel.

The process of the main control board allocating the CPU, configuring the ACL and sending the information required for implementing the IPSec service to the CPU may be performed periodically according to the change of the IP packet, or may be triggered by a control command as required. For example, when the IP address of the client or server changes, or a new IP packet needs to be processed through the IPSec service, such a process may be performed again.

As shown in FIG. 14, the main control board sends the ACL configuration and the data required for implementing the IPSec service to service boards 1-4 through data stream 1.

As mentioned above, the second CPU (namely, CPU8 in service board 4) matches IP packet 1 with the configured ACL, and judges whether IP packet 1 requires IPSec encapsulation. According to the mapping relation between the IPSec service and the CPU in charge of processing the IPSec service, CPU8 finds that the CPU in charge of IPSec encapsulation is CPU1 on service board 1, namely, the executing CPU of IP packet 1 is CPU1.

Step S1302: The first CPU processes the IPSec service for the IP packet and sends the processed packet.

For an IP packet that needs to be encapsulated, the first CPU encapsulates the IP packet; and, for an IP packet that needs to be decapsulated, the first CPU decapsulates the IP packet.

In the 10th embodiment, a load sharing technology is applied; multiple CPUs carry different ACL data streams and processes the IPSec service for different IP packets, and sets up a mapping relation between the IP packet and the CPU in charge of processing the IPSec service for the IP packet. Therefore, the CPUs share the load of data processing for the IP packets averagely, it is ensured that the same CPU processes the IP packets in the same IP tunnel, and the VPN service processing performance of the whole architecture is improved. For example, the number of tunnels created per second, the maximum number of concurrent tunnels, and the throughput of encryption and decryption are increased significantly.

In the technical solution provided in the 10th embodiment, the first CPU in charge of processing the IPSec service for the IP packet is obtained according to the IP packet, and the CPU corresponding to the IP packet implements the IPSec service for the IP packet, thus relieving the workload of the main control board and improving the packet processing efficiency; and different CPUs are used to share load of the IP packets, thus enabling the IPSec service in a high-end VPN device that includes multiple CPUs.

Figure 15:
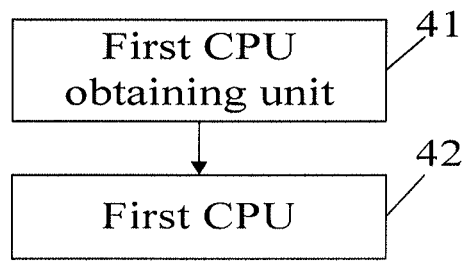
FIG. 15 shows a structure of a packet processing apparatus provided in the 11th embodiment.

As shown in FIG. 15, a packet processing apparatus provided in the 11th embodiment includes:

a first CPU obtaining unit 41, configured to obtain a first CPU in charge of processing an IPSec service for a received IP packet according to the IP packet; and a first CPU 42, configured to process the IPSec service for the IP packet and send the processed packet.

The IP packet may be an IP packet that needs to be encapsulated or an IP packet that needs to be decapsulated. If the IP packet is an IP packet that needs to be decapsulated, the first CPU obtaining unit 41 further includes:

a second CPU obtaining module, configured to obtain a second CPU according to the IP packet to be encapsulated, where the second CPU performs matching for the IP packet according to an ACL and obtains the first CPU.

If the IP packet is an IP packet that needs to be decapsulated, the first CPU obtaining unit 41 further includes:

a calculating module, configured to: perform hash transformation for the IP addresses on both ends of the IPSec tunnel to obtain hash index value, where the IP addresses are carried in the IP packet to be decapsulated; and an obtaining module, configured to obtain the first CPU according to the hash index value.

In the $11^{th}$ embodiment, the first CPU obtaining unit 41 may be an interface board, and the first CPU 42 may be any CPU on the service board.

For the detailed working modes of each unit in the embodiment, see the method embodiment above.

In the technical solution provided in the 11th embodiment, the first CPU in charge of processing the IPSec service for the IP packet is obtained according to the IP packet, and the first CPU implements the IPSec service for the IP packet, thus relieving the workload of the main control board and improving the packet processing efficiency; and different CPUs are used to share load of the IP packets, thus enabling the IPSec service in a high-end VPN device that includes multiple CPUs.

Figure 16:
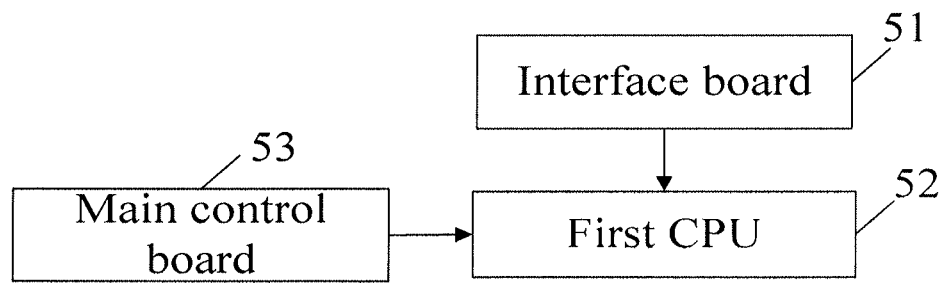
FIG. 16 shows a structure of a packet processing system provided in the 12th embodiment.

As shown in FIG. 16, a packet processing system provided in the 12th embodiment includes at least one interface board and at least two CPUs.

The interface board 51 is configured to obtain a first CPU in charge of processing an IPSec service for a received IP packet according to the IP packet.

The first CPU 52 is configured to process the IPSec service for the IP packet and send the processed packet.

Further, the packet processing system includes:

a main control board 53, configured to: allocate the corresponding first CPU to the IP packet, configure an ACL for the first CPU corresponding to the IP packet, and send the information required for implementing the corresponding IPSec service for the IP packet to the first CPU.

The CPUs may be distributed on one or more service boards. The second CPU and the first CPU serve different purposes when processing IP packets in the same IP tunnel. As physical entities on the VPN device, the second CPU and the executing CPU do not differ essentially, and may be any CPU on the service board.

Figure 17:
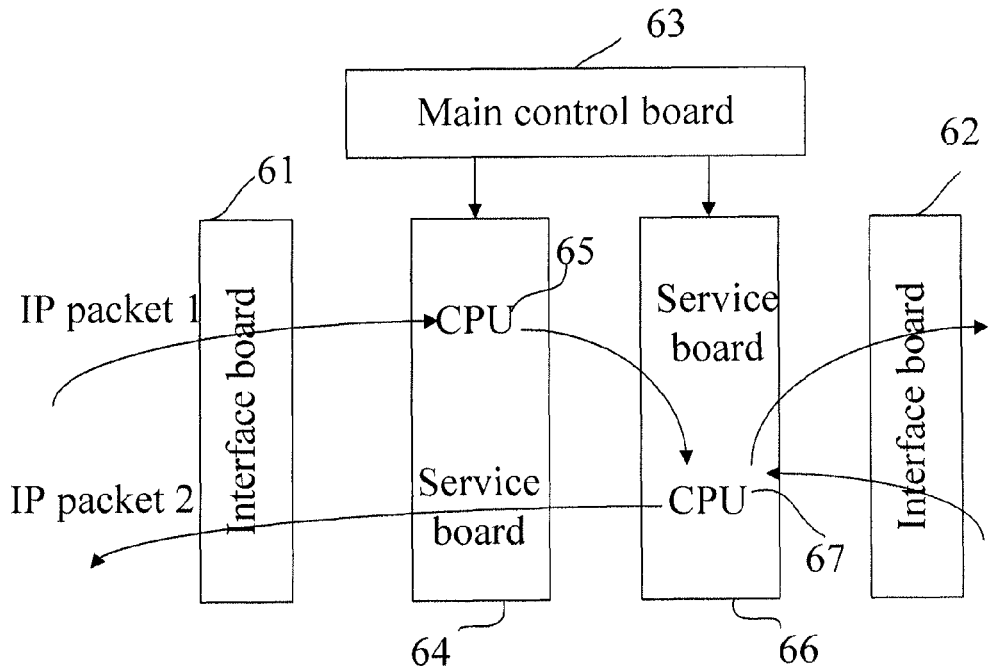
FIG. 17 is a working flowchart of a packet processing system provided in the 12th embodiment.

FIG. 17 is a working flowchart of a packet processing system provided in the 12th embodiment. The packet processing system includes an interface board 61, an interface board 62, a main control board 63, a service board 64 which includes a CPU 65, and a service board 66 which includes a CPU 67. Nevertheless, the composition of the packet processing system is not limited to that. For example, there may be one or more interface boards, and multiple service boards.

The main control board 63 configures ACL data for the service board 64 and the service board 66. The interface board 61 receives IP packet 1, finds that the second CPU of IP packet 1 is the CPU 65 on the service board 64. The CPU 65 performs matching for IP packet 1 according to the ACL data, and finds that the CPU in charge of executing IPSec encapsulation for the IP packet is the CPU 67 on the service board 66. The CPU 67 encapsulates IP packet 1, and sends it out through the interface board 62.

The interface board 62 receives IP packet 2 which is encapsulated in the similar way, finds the executing CPU 67 directly, and sends IP packet 2 to the CPU 67. The CPU 67 decapsulates IP packet 2 and sends it out through the interface board 61.

For the detailed working modes of each functional entity in the packet processing system, see the method embodiments above.

In the technical solution provided in the 12th embodiment, the first CPU in charge of processing the IPSec service for the IP packet is obtained according to the IP packet, and the CPU corresponding to the IP packet implements the IPSec service for the IP packet, thus relieving the workload of the main control board and improving the packet processing efficiency; and different CPUs are used to share load of the IP packets, thus enabling the IPSec service in a high-end VPN device that includes multiple CPUs.

The ninth embodiment and the 10th embodiment above are packet processing methods for implementing an IPSec service. In the IPSec service, a packet processing method may include a process of setting up a tunnel.

Figure 18:
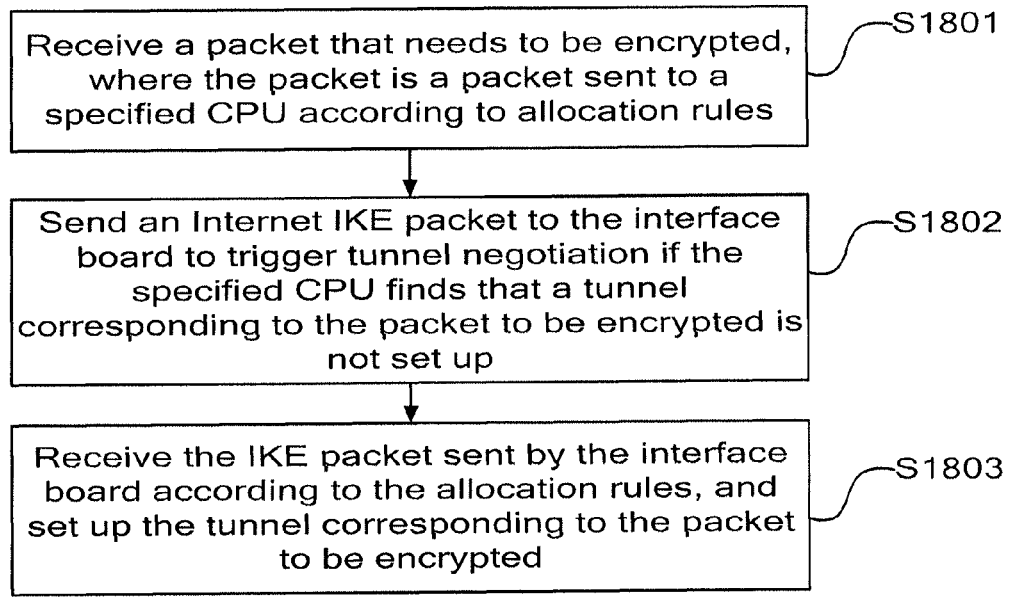
FIG. 18 is a flowchart of a tunnel setup method provided in the 13th embodiment.

FIG. 18 is a flowchart of a tunnel setup method provided in the 13th embodiment. As shown in FIG. 18, the tunnel setup method includes the following steps:

Step S1801: Receive a packet that needs to be encrypted, where the packet is a packet sent to the specified CPU according to allocation rules.

The specified CPU may be a first CPU.

The allocation rules are: The packet is sent to the CPU corresponding to the CPU ID obtained from the interface board, where the CPU ID is calculated out by the interface board through hash calculation on the basis of the source IP address and the destination IP address of the packet.

The interface board performs hash calculation on the basis of the source IP address and the destination IP address of the packet to be sent, obtains a hash value of the packet, and sends the packet to the service board according to the hash value. After receiving the packet, the service board searches for the security policy that matches the packet, and obtains the packet that needs to be encrypted. The service board obtains the CPU ID corresponding to the hash value of the packet to be encrypted, and sends the packet to be encrypted to the specified CPU corresponding to the CPU ID according to the security policy.

The security policy is designed to maintain the data streams generated dynamically in tunnel negotiation, and detect whether the packet received by the service board needs to be encrypted.

After this step, the following steps may occur:

The specified CPU detects whether the tunnel corresponding to the packet to be encrypted is already set up; and the specified CPU performs no tunnel negotiation if the tunnel corresponding to the packet to be encrypted is already set up.

Step S1802: If the specified CPU finds that the tunnel corresponding to the packet to be encrypted is not set up, the specified CPU sends an Internet Key Exchange (IKE) packet to the interface board to trigger tunnel negotiation.

Step S1803: Receive the IKE packet sent by the interface board according to the allocation rules, and set up the tunnel.

The interface board may send the IKE packet according to the allocation rules in this way: The interface board performs hash calculation on the basis of the received source IP address and destination IP address of the IKE packet to obtain a CPU ID for tunnel negotiation; and sends the IKE packet according to the CPU ID of tunnel negotiation.

In the tunnel setup method provided in this embodiment, when the packet received by the service board is an IKE negotiation packet, the IKE packet may be sent to the interface board directly to perform tunnel negotiation; after receiving the IKE packet, the interface board performs hash calculation on the basis of the source IP address and the destination IP address of the IKE packet to obtain a CPU ID for tunnel negotiation; and the service board receives the IKE packet sent by the interface board, and sets up a tunnel.

It is worthy of attention that the CPUs are distributed on one or more service boards of the gateway. The number of CPUs and the number of service boards depend on the requirement of the gateway for processing the service.

Through this embodiment, IPsec services and IKE negotiation can be performed on the service board, thus relieving the workload of the main control board and improving the packet processing efficiency. Through the allocation rules provided in this embodiment, the IKE negotiation can be balanced among different service boards, thus improving the system capabilities in processing the IPSec service and IKE negotiation.

Figure 19:
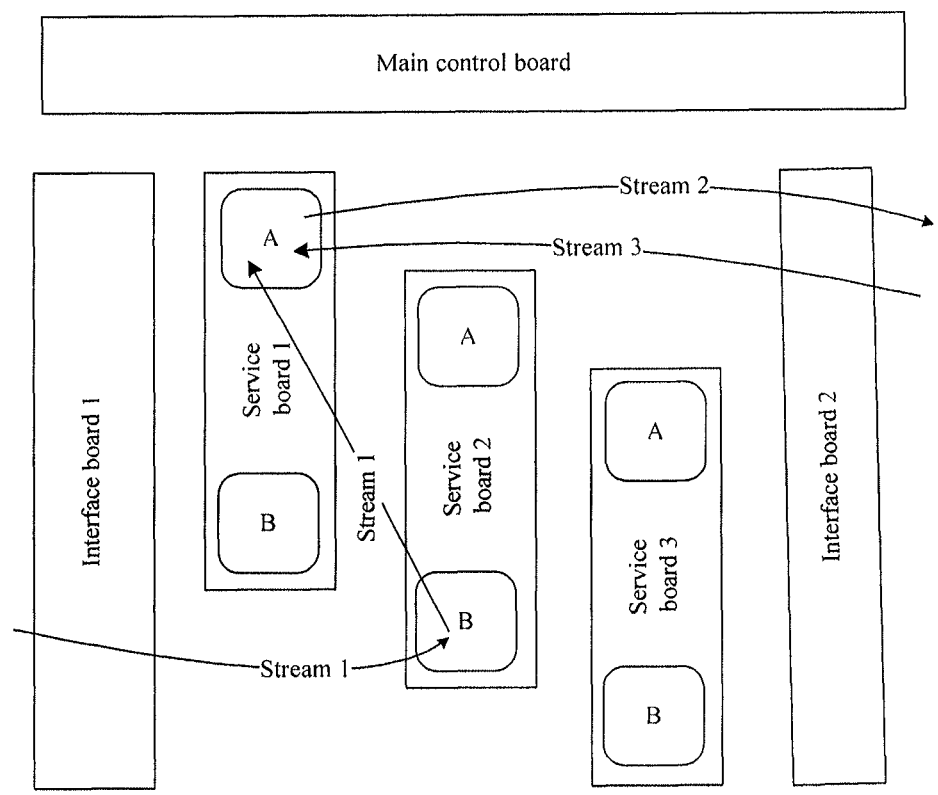
FIG. 19 is a brief flowchart of implementing IKE negotiation in a distributed architecture in an embodiment.
Figure 20:
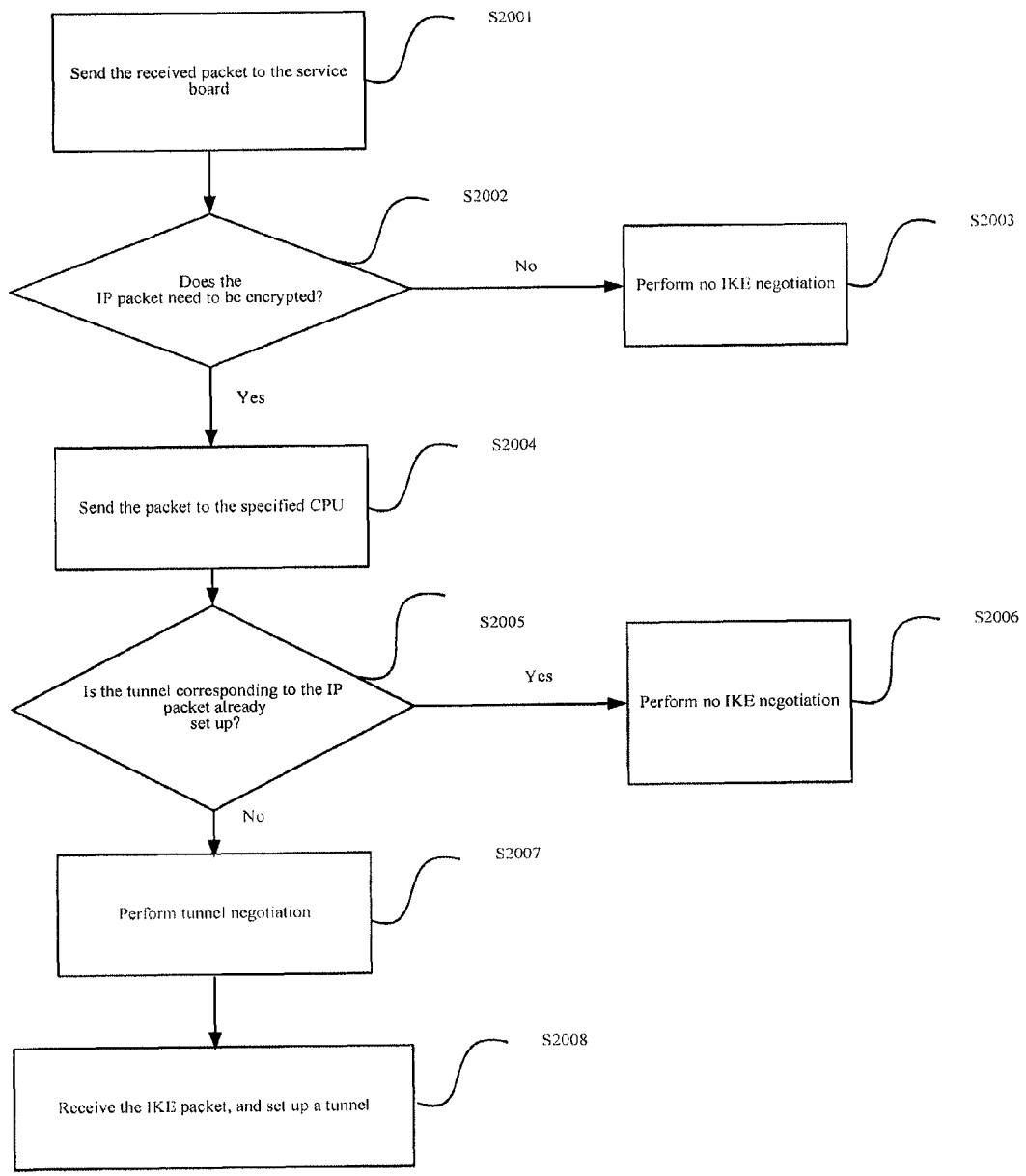
FIG. 20 is a flowchart of IKE negotiation provided in an embodiment.

Through the tunnel setup method provided in this embodiment, the IKE negotiation may be implemented on the service board in a distributed architecture. Therefore, the tunnels for transmitting packets are distributed onto all CPUs in the tunnel negotiation, thus improving the capacity and performance of the whole system. FIG. 19 is a brief flowchart in a distributed architecture. In order to make the implementation clearer, it is assumed that an existing distributed architecture includes three service boards, one main control board, and two interface boards. Each service board includes two CPUs, for example, CPU A and CPU B on the service board. In practice, more CPUs may be added on each service board as required. In FIG. 19, there are a total of three data streams: data stream 1 for transmitting IP packets, data stream 2 for sending IKE packets, and data stream 3 for sending the IKE packet which is calculated out by the second interface board for the purpose of tunnel negotiation. As shown in FIG. 20, the method for implementing IKE negotiation and setting up a tunnel includes the following steps:

Step S2001: Send the received packet to the service board.

After receiving an IP packet, the first interface board calculates the hash value for the source IP address and the destination IP address of the IP packet, obtains the CPU ID corresponding to the CPU that receives the packet, and then sends the IP packet through data stream 1 to the CPU that matches the CPU ID, namely, B-CPU on the second service board in FIG. 19.

Step S2002: Detect whether the IP packet needs to be encrypted. Proceed to step S2003 if the IP packet needs no encryption, or proceed to step S2004 if the IP packet needs to be encrypted.

Step S2003: Perform no IKE negotiation.

Step S2004: Send the IP packet to be encrypted to the specified CPU.

After receiving the IP packet, the service board searches for the security policy that matches the packet, and obtains the packet that needs to be encrypted. Afterward, the service board obtains the CPU ID corresponding to the packet to be encrypted. The CPU ID is generated in step S2008. The packet to be encrypted is sent to the CPU corresponding to the CPU ID according to the matched security policy. This CPU is the CPU corresponding to the tunnel for transmitting the packet to be encrypted. In the example shown in FIG. 19, B-CPU on the second service board selects A-CPU on the first service board through matching based on the security policy, and then the IP packet to be encrypted is sent to A-CPU on the first service board through data stream 1.

Step S2005: Detect whether the tunnel corresponding to the packet to be encrypted is already set up. Proceed to step S2006 if the tunnel corresponding to the packet to be encrypted is already set up, or perform step S2007 if the tunnel corresponding to the packet to be encrypted is not set up.

Step S2006: Perform no IKE negotiation. The packet is transmitted through the tunnel corresponding to the packet to be encrypted if this tunnel is already set up.

Step S2007: Perform tunnel negotiation.

After receiving an IP packet, the CPU in the service board matches the packet with the security policy in the security policy unit; and, if finding that the tunnel corresponding to the packet is not set up, sends the IKE packet through data stream 2 to perform tunnel negotiation. After an IKE negotiation packet is received, data stream 2 is generated as a response.

Step S2008: Receive the IKE packet, and set up a tunnel.

After receiving an IKE packet whose destination IP address is the local device, the second interface board performs hash calculation on the basis of the source IP address and the destination IP address to obtain a CPU ID for IKE negotiation. The CPU corresponding to this CPU ID is the CPU specified in step S2004. According to this CPU ID, the corresponding CPU can be selected for performing encryption when the IP packet enters the tunnel (the CPU selected in FIG. 19 is A-CPU in the first service board). The interface board sends the IKE to the A-CPU on the first service board according to the calculated CPU ID, and the tunnel is set up.

It is worthy of attention that stream 1 and stream 3 in the same tunnel carry the packet to the same CPU. On in this way, the tunnel for transmitting the packet to be encrypted can be set up. Negotiation is initiated proactively only in an isakmp mode. The isakmp mode involves configuration of a tunnel. At time of configuring the tunnel, the source IP address and the destination IP address of the tunnel are obtained. The hash values of the IP addresses are calculated out on the main control board, and sent to all service boards (so that stream 1 can find the specified CPU successfully). In this way, the CPU selected by stream 1 is the same as the CPU selected by stream 3. Besides, the number of service boards and the number of CPUs are not limited to the examples given in FIG. 19, and may be set according to the requirement of the gateway for processing the service data.

Through this embodiment, all IPSec services can be implemented on the service boards. All service boards are capable of processing IPSec services and IKE negotiation. The CPUs on the service board set up a tunnel for sending the encrypted packets through IKE negotiation, thus relieving the workload of the main control board and improving the packet processing efficiency. Based on the foregoing allocation rules, the hash values calculated out according to different IKE packets are different, and the IKE negotiation can be balanced on different service boards. Therefore, with more service boards in use, the distributed architecture is more capable of processing IPSec services and IKE negotiation.

The 12th embodiment above is a packet processing system for implementing an IPSec service. In the IPSec service, a packet processing system may further include a tunnel setup device connected with the interface board.

The tunnel setup device is configured to: receive the packet sent by the interface board according to allocation rules; send the packet to be encrypted to the specified CPU according to the allocation rules; send an IKE packet to the interface board to trigger tunnel negotiation if the specified CPU detects that the tunnel corresponding to the packet is not set up; and receive the IKE packet sent by the interface board according to the allocation rules, and set up a tunnel.

The interface board is configured to: send the packet to the tunnel setup device according to the allocation rules; receive the IKE packet sent by the tunnel setup device, and perform hash value calculation on the basis of the source IP address and the destination IP address of the IKE packet to obtain a CPU ID for tunnel negotiation; and send the IKE packet to the tunnel setup device.

The allocation rules are: The packet is sent to the CPU corresponding to the CPU ID obtained from the interface board, where the CPU ID is calculated out by the interface board through hash calculation on the basis of the source IP address and the destination IP address of the packet. The CPU is located in the tunnel setup device, and is configured to receive the packet to be encrypted and detect whether the tunnel corresponding to the packet is set up. In practice, the tunnel setup device may be one or more service boards on the gateway; the CPUs are distributed on all service boards, and the number of CPUs and the number of service boards depend on the requirement of the gateway for processing services.

Figure 21:
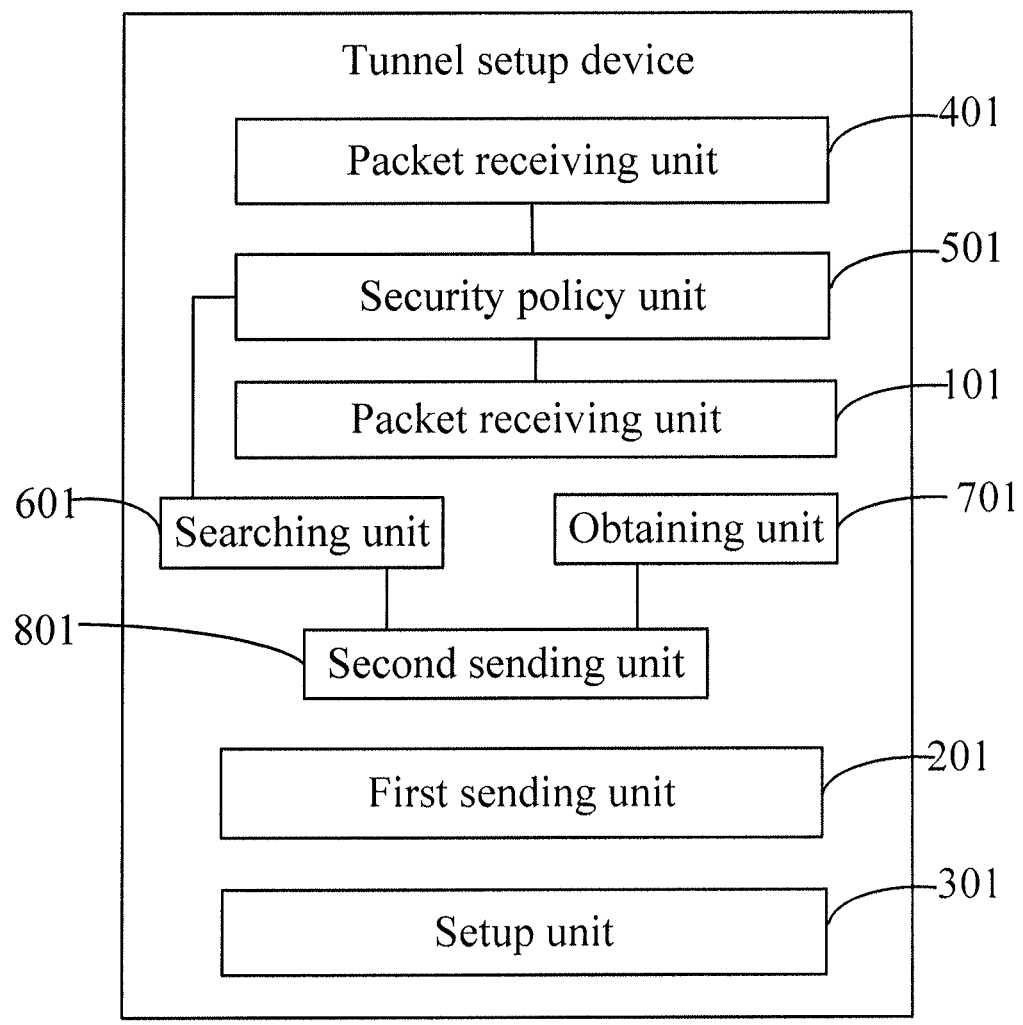
FIG. 21 shows a structure of a tunnel setup device provided in the 14th embodiment.

FIG. 21 shows a structure of a tunnel setup device provided in the 14th embodiment. As shown in FIG. 21, the tunnel setup device includes:

a packet receiving unit 101, configured to: receive a packet that needs to be encrypted, where the packet is a packet sent to the specified CPU according to allocation rules;

a first sending unit 201, configured to send an IKE packet to the interface board to trigger tunnel negotiation if the specified CPU finds that the tunnel corresponding to the packet is not set up; and a setup unit 301, configured to: receive the IKE packet sent by the interface board according to the allocation rules, and set up the tunnel.

The allocation rules are: The packet is sent to the CPU corresponding to the CPU ID obtained from the interface board, where the CPU ID is calculated out by the interface board through hash calculation on the basis of the source IP address and the destination IP address of the packet.

The device may further include a packet receiving unit 401, which is configured to receive the packet sent by the interface board according to the allocation rules. Besides, the packet receiving unit 401 is further configured to receive IKE negotiation packets.

The tunnel setup device may further include a security policy unit 501, which is configured to configure the security policy, maintain the data streams generated dynamically in tunnel negotiation, and detect whether the packet received by the packet receiving unit 401 needs to be encrypted.

The tunnel setup device may further include:

a searching unit 601, configured to: search the security policy unit 501 for the security policy that matches the packet, and obtain the packet that needs to be encrypted;

an obtaining unit 701, configured to obtain the ID of the CPU for receiving the packet to be encrypted; and a second sending unit 801, configured to: send the packet to be encrypted, which is obtained by the searching unit 601, to the specified CPU corresponding to the CPU ID obtained by the obtaining unit 701 according to the security policy.

In this embodiment, the tunnel setup device may be one or more service boards on the gateway; the CPUs are distributed on all service boards, and the number of CPUs and the number of service boards depend on the requirement of the gateway for processing services.

Through the tunnel setup device provided in this embodiment, IPsec services and IKE negotiation can be performed on the service board, thus relieving the workload of the main control board and improving the packet processing efficiency. Through the allocation rules provided in this embodiment, the IKE negotiation can be balanced among different service boards, thus improving the system capabilities in processing the IPSec service and IKE negotiation.

It is understandable to those skilled in the art that the accompanying drawings are only schematic diagrams of the preferred embodiments, and the modules or processes in the accompanying drawings are not mandatory for implementing the present invention.

It is understandable to those skilled in the art that the modules in an apparatus provided in embodiments may be distributed into the apparatus described herein, or may be located in one or more apparatuses different from the apparatus described herein. The modules may be combined into one module, or split into multiple sub modules.

The serial number of the embodiments is designed to facilitate description only, and does not represent priority of the embodiments.

Persons of ordinary skilled in the art should understand that all or part of the steps of the method described in the embodiments may be implemented by a program instructing relevant hardware. The program may be stored in one or more computer readable storage media. When the program runs, the steps of the method under the present invention are performed. The storage media may be a magnetic disk, CD-ROM, Read-Only Memory (ROM), or Random Access Memory (RAM).

Finally, it should be noted that the above embodiments are merely provided for describing the technical solutions of the claims, but are not intended to limit the claims. It is apparent that persons skilled in the art can make various modifications and variations to the embodiments and that such embodiments may still fall within the scope of the claims.

The invention claimed is:

1. A method for processing packets applied to a distributed packet processing system having multiple Central Processing Units (CPUs), wherein the method comprises:

receiving a packet;

determining whether to perform an encapsulation on the received packet;

after determining to perform an encapsulation on the received packet, determining a first CPU ID according to an internet protocol (IP) address carried in the received packet and configured information, wherein the configured information comprises at least the IP address and the first CPU ID, and wherein the first CPU ID in the configured information is obtained by performing a hash calculation using IP addresses of both ends of a tunnel for transmitting the received packet; and sending the received packet to a first CPU corresponding to the first CPU ID for encapsulation.

2. The method of claim 1, further comprising:

after determining not to perform an encapsulation on the received packet, performing a hash calculation based on a source IP address and an object IP address of the received packet;

determining a second CPU ID according to a hash index; and sending the received packet to a second CPU corresponding to the second CPU ID to decapsulate the received packet.

3. The method of claim 1, wherein the method further comprises:

after determining not to perform an encapsulation on the received packet, performing a hash calculation based on a source IP address and an object IP address of the received packet;

determining a third CPU ID according to a hash index;

if the received packet includes a request for setting up a tunnel between a client device and a third CPU corresponding to the third CPU ID, sending the received packet to the third CPU to set up the tunnel between the client device and the third CPU.

4. The method of claim 1, wherein the configured information is at least one of a generic routing encapsulation (GRE) route information, an access control list (ACL) and a security policy.

5. The method of claim 1, wherein the method is executed by a service board or an interface board in the distributed packet processing system.

6. The method of claim 5, further comprising:

configuring, by a main control board in the distributed packet processing system, a generic routing encapsulation (GRE) tunnel between the first CPU and a client device;

performing, by the main control board, the hash calculation based on the IP addresses on both ends of the GRE tunnel;

selecting, by the main control board, the first CPU ID according to a hash index;

storing, by the main control board, a mapping relation between an IP address of the client device and the first CPU ID into the configured information, wherein the configured information is GRE route information and the IP address of the client device is the IP address carried in the received packet; and broadcasting, by the main control board, the GRE route information to the service board or the interface board.

7. A packet processing apparatus in a distributed packet processing system comprising a plurality of central processing units (CPUs) to process services, comprising:

a processor; and a memory having a program stored thereon which, when executed by the processor, causes the processor to:

receive a packet;

determine whether to perform an encapsulation on the received packet;

after determining to perform an encapsulation on the received packet, determine a first CPU identifier (ID) according to an IP address carried in the received packet and configured information, wherein the configured information comprises at least the IP address and the first CPU ID, and wherein the first CPU ID in the configured information is obtained by performing a hash calculation using IP addresses of both ends of a tunnel for transmitting the received packet; and send the received packet to a first CPU corresponding to the first CPU ID to encapsulate the received packet.

8. The apparatus of the claim 7, wherein the processor is further configured to:

after determining not to perform an encapsulation on the received packet, perform a hash calculation based on a source IP address and an object IP address of the received packet;

determine a second CPU ID according to a hash index; and send the received packet to a second CPU corresponding to the second CPU ID to decapsulate the received packet.

9. The apparatus of the claim 7, wherein the processor is further configured to:

after determining not to perform an encapsulation on the received packet, perform a hash calculation based on a source IP address and an object IP address of the received packet;

determining a third CPU ID according to a hash index;

if the received packet includes a request for setting up a tunnel between a client device and a third CPU corresponding to the third CPU ID, send the received packet to the third CPU to set up the tunnel between the client device and the third CPU.

10. The apparatus of the claim 7, wherein the configured information is at least one of a generic routing encapsulation (GRE) route information, an access control list (ACL) and a security policy.

11. The apparatus of claim 7, wherein the apparatus is a service board or an interface board in the distributed packet processing system.

12. The apparatus according to claim 7, wherein, if the configured information is GRE route information, the processor is further configured to:

receive the GRE route information from a main control board, wherein the GRE route information comprises a mapping relation between an IP address of a client device and the first CPU ID, the IP address of the client device is the IP address carried in the received packet, and the first CPU ID of the first CPU is obtained according to the hash calculation based on the IP addresses on both ends of a GRE tunnel, which configured by the main control board, between the first CPU and the client device.

13. A distributed packet processing system comprising a main control board and a packet processing apparatus, wherein:

the main control board is configured to send configured information to the packet processing apparatus;

the packet processing apparatus is configured to:

receive a packet;

determine whether to perform an encapsulation on the received packet;

after determining to perform an encapsulation on the received packet, determine a first central processing unit (CPU) identifier (ID) according to an IP address carried in the received packet and the configured information, wherein the configured information comprises at least the IP address and the first CPU ID, and wherein the first CPU ID in the configured information is obtained by performing a hash calculation using IP addresses of both ends of a tunnel for transmitting the received packet; and send the received packet to a first CPU corresponding to the first CPU ID to encapsulate the received packet.

14. The system according to the claim 13, wherein the packet processing apparatus is an interface board or a service board.

15. The system of the claim 14, wherein the packet processing apparatus is further configured to:

after determining not to perform an encapsulation on the received packet, perform a hash calculation based on a source IP address and an object IP address of the received packet;

determine a second CPU ID according to a hash index; and send the received packet to a second CPU corresponding to the second CPU ID to decapsulate the received packet.

16. The system of the claim 14, wherein the packet processing apparatus is further configured to:

after determining not to perform an encapsulation on the received packet, perform a hash calculation based on a source IP address and an object IP address of the received packet;

determining a third CPU ID according to a hash index; and if the received packet includes a request for setting up a tunnel between a client device and a third CPU corresponding to the third CPU ID, send the received packet to the third CPU to set up the tunnel between the client device and the third CPU.

17. The system of the claim 14, wherein the main control board is further configured to:

configure a generic routing encapsulation (GRE) tunnel between the first CPU and a client device;

perform the hash calculation based on the IP addresses on both ends of the GRE tunnel;

select the first CPU ID of the first CPU according to a hash index; and store a mapping relation between an IP address of the client device and the first CPU ID of the first CPU into the configured information, wherein the configured information is a GRE route information and the IP address of the client device is the IP address carried packet.

18. The system of the claim 13, wherein the configured information is at least one of a GRE route information, an access control list (ACL) and a security policy.

* * * * *